US006304954B1

(12) United States Patent
Munson

(10) Patent No.: US 6,304,954 B1
(45) Date of Patent: Oct. 16, 2001

(54) EXECUTING MULTIPLE INSTRUCTIONS IN MULTI-PIPELINED PROCESSOR BY DYNAMICALLY SWITCHING MEMORY PORTS OF FEWER NUMBER THAN THE PIPELINE

(75) Inventor: Kenneth K. Munson, Saratoga, CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/151,634

(22) Filed: Sep. 11, 1998

Related U.S. Application Data

(63) Continuation-in-part of application No. 09/062,804, filed on Apr. 20, 1998, now abandoned.

(51) Int. Cl.[7] ........................................................ G06F 9/34
(52) U.S. Cl. ........................... 712/215; 711/125; 711/149; 712/225; 712/23
(58) Field of Search .................................. 712/215, 225, 712/23; 711/125, 149

(56) References Cited

U.S. PATENT DOCUMENTS

| 5,594,864 | 1/1997 | Trauben | 714/39 |
|---|---|---|---|
| 5,692,139 | * 11/1997 | Slavenberg et al. | 710/131 |
| 5,696,935 | * 12/1997 | Grochowski et al. | 711/125 |
| 5,761,475 | * 6/1998 | Yung et al. | 712/218 |
| 5,809,514 | 9/1998 | Nasserbakht et al. | 711/3 |
| 5,924,117 | * 7/1999 | Luick | 711/127 |

* cited by examiner

Primary Examiner—Kenneth S. Kim
(74) Attorney, Agent, or Firm—Oblon, Spivak, McClelland, Maier & Neustadt, P.C.

(57) ABSTRACT

Three parallel instruction processing pipelines of a microprocessor share two data memory ports for obtaining operands and writing back results. Since a significant proportion of the instructions of a typical computer program do not require reading operands from the memory, the probability is high that at least one of any three program instructions to be executed at the same time need not fetch an operand from memory. The two memory ports are thus connected at any given time with the two of the three pipelines which are processing instructions that require memory access, the pipeline without access to the memory processing an instruction that does not need it. To do so, the added third pipeline need not have all the same resources as the other two pipelines, so its stages are made to have a reduced capability in order to save space and reduce power consumption. The stages of the three pipelines are also dynamically interchanged in response to the specific combination of three instructions being processed at the same time, in order to increase the rate of processing a large number of instructions.

18 Claims, 15 Drawing Sheets

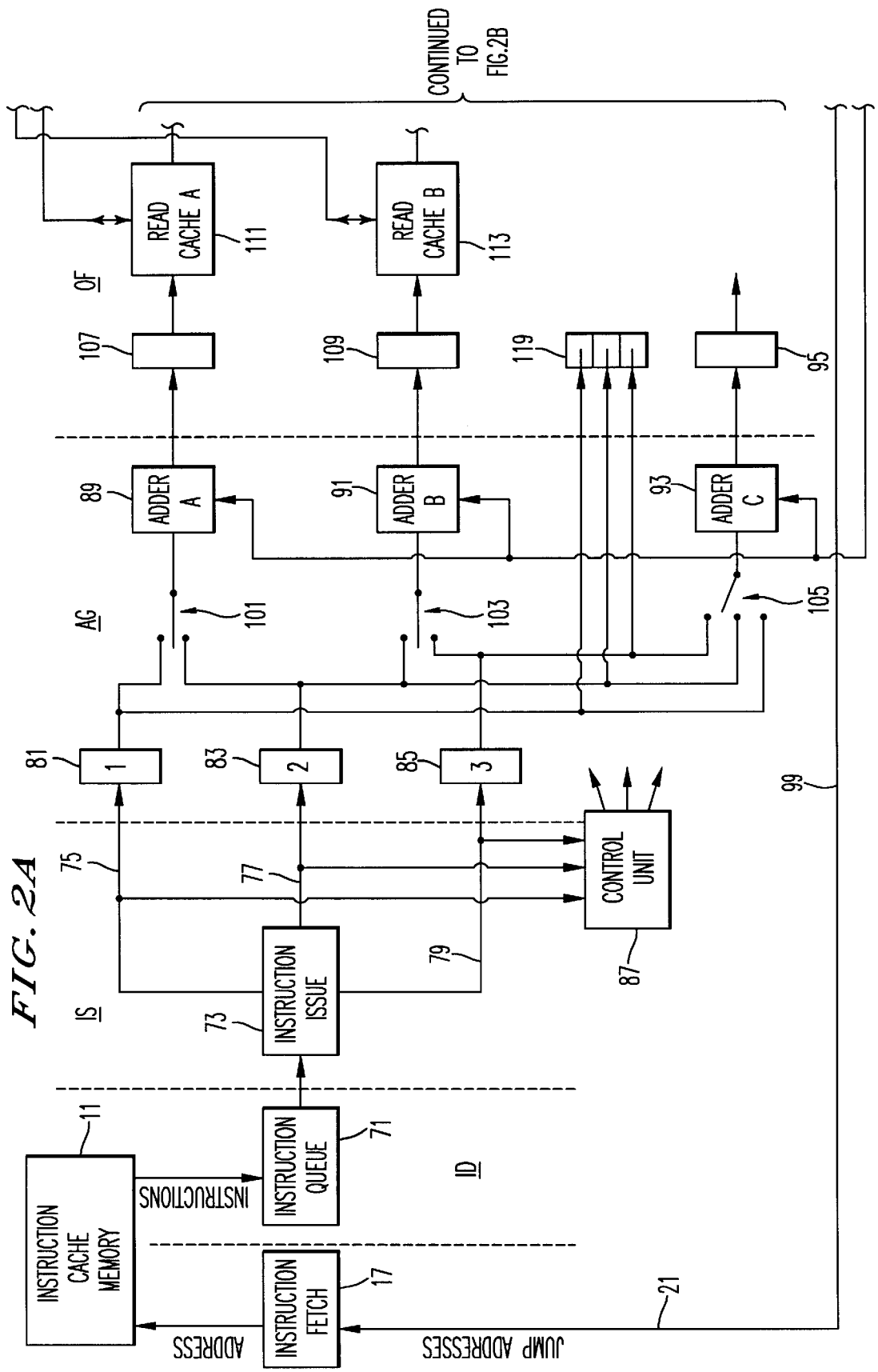

QUEUE REGISTER

QUEUE REGISTER DATA

EXECUTING MULTIPLE INSTRUCTIONS IN MULTI-PIPELINED PROCESSOR BY DYNAMICALLY SWITCHING MEMORY PORTS OF FEWER NUMBER THAN THE PIPELINE

CROSS-REFERENCE TO RELATED APPLICATION

This is a continuation-in-part of patent application Ser. No. 09/062,804, filed Apr. 20, 1998, now abandoned which application is expressly incorporated herein in its entirety by this reference.

BACKGROUND OF THE INVENTION

This invention relates generally to the architecture of microprocessors, and, more specifically, to the structure and use of parallel instruction processing pipelines.

A multi-staged pipeline is commonly used in a single integrated circuit chip microprocessor. A different step of the processing of an instruction is accomplished at each stage of the pipeline. For example, one important stage generates from the instruction and other data to which the instruction points, such as data stored in registers on the same chip, an address of the location in memory where an operand is stored that needs to be retrieved for processing. A next stage of the pipeline typically reads the memory at that address in order to fetch the operand and make it available for use within the pipeline. A subsequent stage typically executes the instruction with the operand and any other data pointed to by the instruction. The execution stage includes an arithmetic logic unit (ALU) that uses the operand and other data to perform either a calculation, such as addition, subtraction, multiplication, or division, or a logical combination according to what is specified by the instruction. The result is then, in a further stage, written back into either the memory or into one of the registers. As one instruction is moved along the pipeline, another is right behind it so that, in effect, a number of instructions equal to the number of stages in the pipeline are being simultaneously processed.

Two parallel multi-stage pipelines are also commonly used. Two instructions may potentially be processed in parallel as they move along the two pipelines. When some interdependency exists between two successive instructions, however, they often cannot be started along the pipeline at the same time. One such interdependency is where the second instruction requires for its execution the result of the execution of the first instruction. Each of the two pipelines has independent access to a data memory through one of two ports for reading operands from it and writing results of the instruction execution back into it. The memory accessed by the pipelines is generally on the integrated circuit chip as cache memory, which, in turn, accesses other semiconductor memory, a magnetic disk drive or other mass storage that is outside of the single microprocessor integrated circuit chip.

It continues to be a goal of processor design to increase the rate at which program instructions are processed. Therefore, it is the primary object of the present invention to provide an architecture for a pipelined microprocessor that makes possible an increased instruction processing throughput.

It is another object of the present invention to provide such a pipelined microprocessor that minimizes the additional amount of power consumed and integrated circuit space required to obtain a given increase the rate of processing program instructions.

SUMMARY OF THE INVENTION

These and additional objects are accomplished by the various aspects of the present invention, wherein, briefly and generally, according to one such aspect, three or more parallel pipelines are provided without having to use more than two data memory ports to retrieve operands or store the results of the instruction processing. It is undesirable to use a memory with more than two ports, or to use two or more separate data memories, since the complexity, power consumed and space taken by such many ported memories is highly undesirable. It has been recognized, as part of the present invention, that since a significant proportion of the individual instructions of most programs do not need access to data memory in order to be executed, an extra pipeline without such access still results in a significant increase in processing speed without a disproportionate increase in the amount of circuitry or power consumption. In a specific implementation of this aspect of the invention, three instructions are processed in parallel in three pipelines at one time so long as one of those instructions does not need access to the data memory. The two ports of the data memory are made available to the two pipelines processing instructions that need access to the data memory, while the third pipeline processes an instruction that does not require such access.

A three pipeline architecture is preferred. If all three instructions queued for entry into the three pipelines at one time all need access to the data memory, then one of the instructions is held. In this case, the third pipeline is not fully utilized for at least one cycle, but this does not occur excessively because of the high proportion of instructions in most operating systems and programs that do not need access to the data memory. A fourth pipeline may further be added for use with a two port data memory if that proportion of instructions not needing data memory access is high enough to justify the added integrated circuit space and power consumed by the additional pipeline circuitry.

According to another aspect of the present invention, the third pipeline is made simpler than the other two, since there is also a high enough proportion of instructions that do not need the complex, high performance pipeline stages normally supplied for processing the most complex instructions. A preferred form of the present invention includes two pipelines with stages having the normal full capability while at least some of the stages of the third pipeline are significantly simplified. In a specific implementation of this aspect of the present invention, the address generation stage of the third pipeline is made simpler than the address generation stage of the other two pipelines. The third address generation stage may, for example, be especially adapted to only calculate instruction addresses in response to jump instructions. The ALU of the execution stage of the third pipeline is also, in a specific implementation, made to be much simpler than the ALUs of the other two pipelines. The third ALU, for example, may be dedicated to executing move instructions. The simpler third pipeline stages minimize the extra integrated circuit space and power required of the third pipeline. Yet, a significant increase in through put of processing instructions is achieved.

According to a further aspect of the present invention, individual ones of the multiple stages of each of the pipelines are interconnectable with each other between the pipelines in order to take advantage of a multiple pipelined architecture where the capability and functions performed by a given stage of one pipeline is different than that of the same stage of another pipeline. This allows the pipelines to be dynamically configured according to the need of each instruction. Stages capable of processing a given instruction are connected together without having to use stages with excessive capability in most cases. One instruction, for example, may require a full capability address generator but then only needs the simplest ALU, so the instruction is routed through these two stages. For another instruction, as another example, no address generator may be necessary but a full capability ALU may be required.

The ideal operation which is sought to be achieved is to have three pipelines operating on three instructions all the time with no more circuitry (and thus no more space or power consumption) than is absolutely necessary to process each instruction. Each of the various aspects of the present invention contributes to moving closer to that ideal, the most improvement being obtained when all of these aspects of the present invention are implemented together.

Additional objects, advantages, and features of the present invention will become apparent from the following description of its preferred embodiments, which description should be take in conjunction with the accompanying drawings.

DESCRIPTION OF THE PREFERRED EMBODIMENTS

Figure 1A:
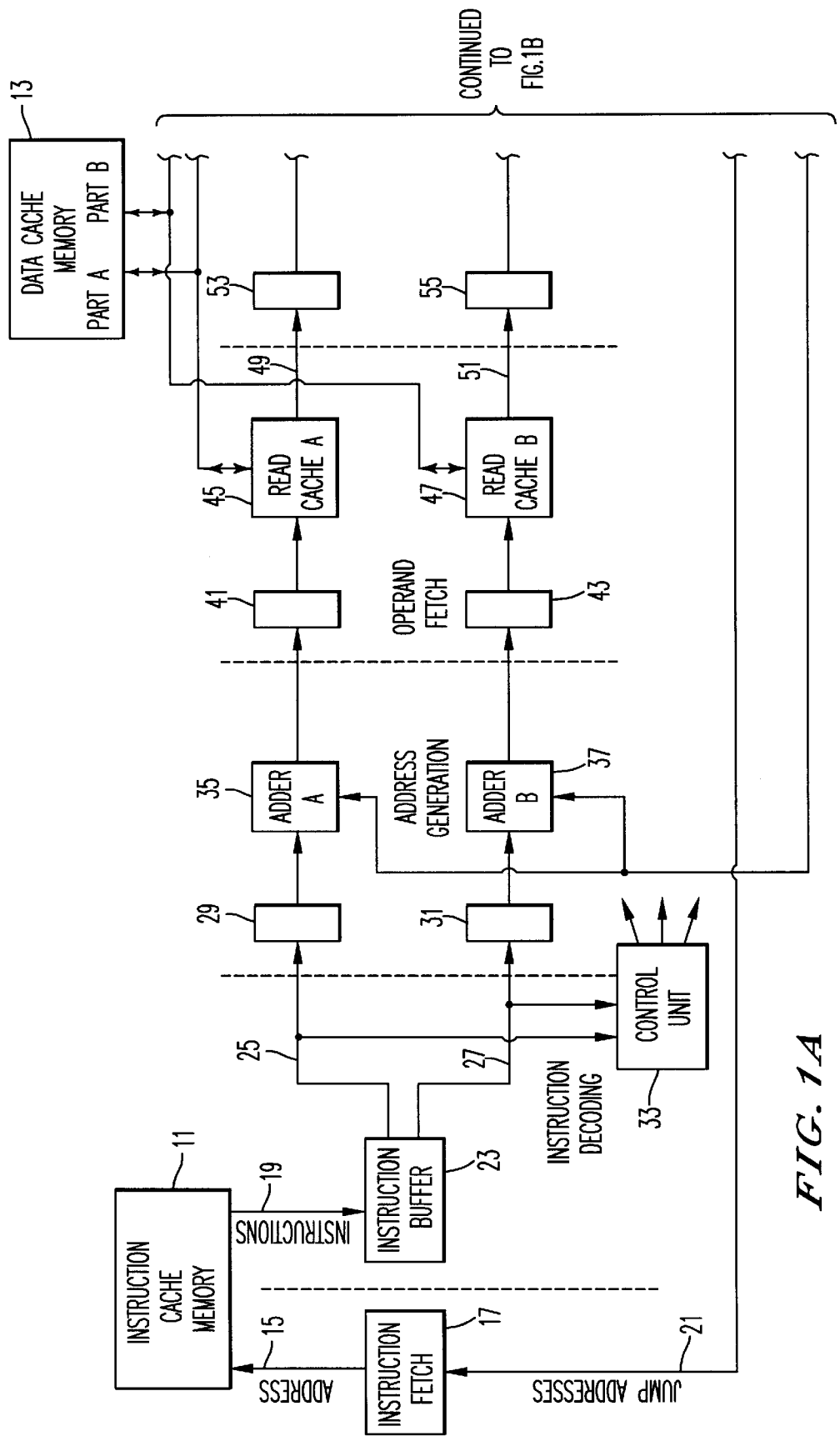
FIG. 1 is a block diagram of a prior art two pipeline microprocessor architecture.
Figure 1B:
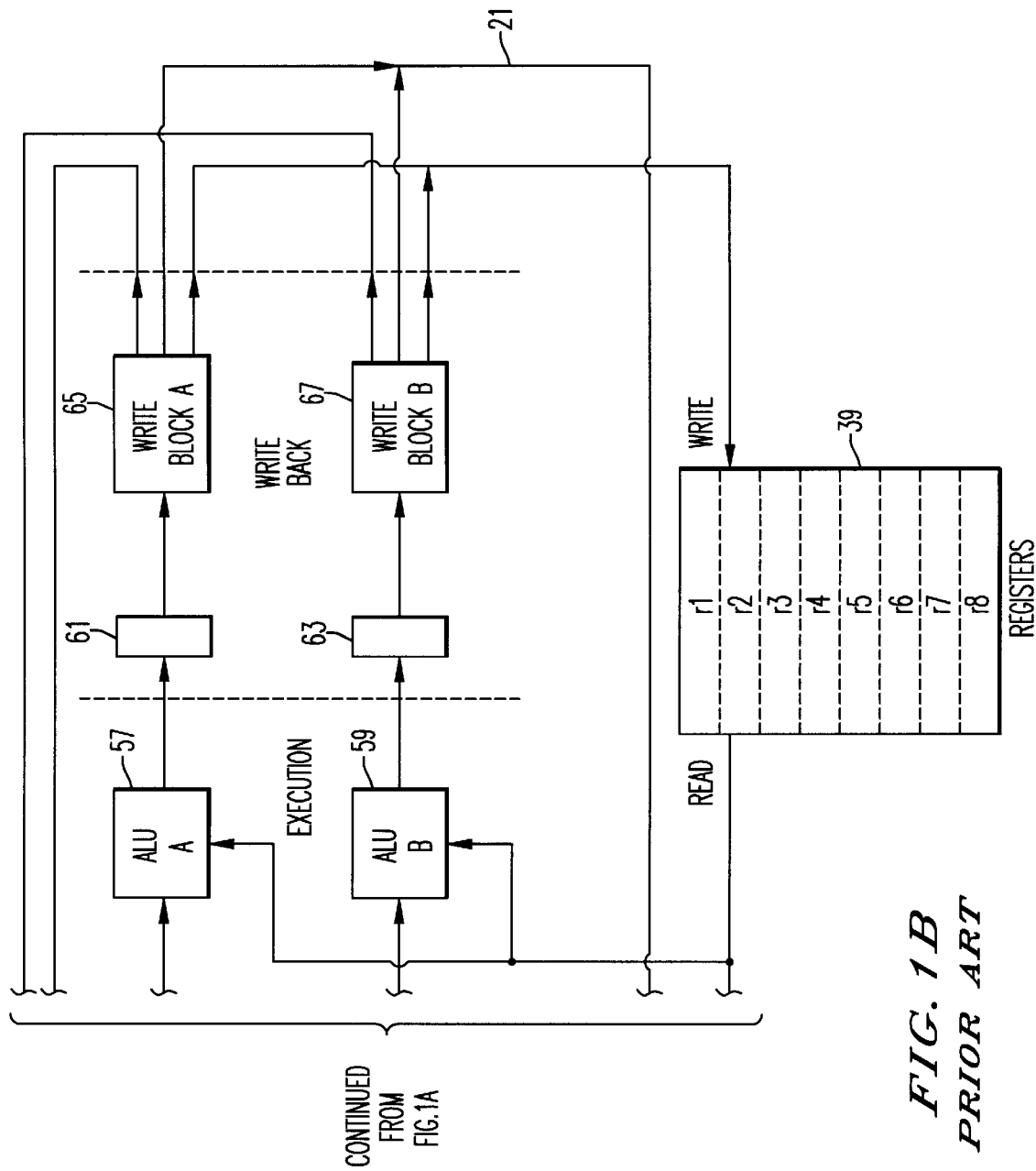

As background, a prior all architecture of a single chip microprocessor with two pipelines, each having multiple stages, is described with respect to FIG. 1. What is shown in FIG. 1, is provided on a single integrated circuit chip. That includes some on-board memory, usually cache memory, such as an instruction cache 11 and a data cache 13. The instruction cache 11 stores instructions that are frequently being executed, and the data cache 13 stores data that is frequently being accessed to execute the instructions. The instruction and data cache memories 11 and 13 are sometimes combined into one memory but more often are provided as physically separate memories. Access to dynamic random access memory (DRAM), magnetic disk drives, and other forms of mass storage, currently all off the microprocessor chip, is not shown in the figures of the present application but is operated with the on-board cache memories in a standard manner.

Addresses of instructions and memory are generated in a circuit 15 by an instruction fetch block 17. A main component of the instruction fetch block 17 is a program counter that increments from a starting address within the cache memory 11 through successive addresses in order to serially read out in a circuit 19 successive instructions stored at those addresses. The instruction fetch block 17 is also responsive to an address in a circuit 21 to jump out of order to a specified beginning address from which the program counter then counts until another jump address is received.

The instructions read one at a time out of the cache memory 11 are stored in a buffer 23 that decodes them sufficiently so that one instruction is passed through circuits 25 and another instruction is passed through circuits 27 at the same time. The circuits 25 and 27 are the beginnings of the parallel pipeline stages, with the instruction buffer 23 providing an initial stage to each of these pipelines. Latches 29 and 31 are included in the paths of each of the two pipelines for temporarily storing the instructions that are being separately processed by the two pipelines.

Each of these instructions is also connected with a control unit 33 having outputs that are connected (not shown for simplicity) to most of the other blocks of the pipeline in order to control their operation. The control unit 33 decodes each of the instructions presented in the circuits 25 and 27 in order to specify how each of the stages of the two pipelines is to operate to execute that instruction. For example, a signal from the control unit 33 normally latches the instructions in the circuits 25 and 27 in the respective latches 29 and 31. However, there are circumstances where both instructions are not allowed to proceed down the pipelines at the same time. For example, the instruction in the circuit 27 may require a result of the execution of the instruction and circuit 25. Thus, the instruction in the circuit 27 is not stored in the latch 31 at the same time as the instruction is stored in the latch 29. Rather, the instruction in the circuit 27 is entered into a pipeline in a subsequent cycle, so the result of the execution of the first instruction is available to it when required.

Each of the pipelines includes an address generation stage, their primary components being adders 35 and 37. The purpose of each of these adders is to calculate an address in the data cache memory 13 where an operand is to be found that is necessary to execute the instruction. The address is calculated by each adder from information provided in the instruction itself or data read from one of several registers 39 that are also provided as part of the microprocessor integrated circuit. According to one architectural standard, eight such registers r1 through r8 are included, while more registers are used in other architectural standards. An instruction often requires data to be read from at least one of the registers in the course of calculating the address.

The calculated memory addresses of the two instructions being processed in parallel are then stored in latches 41 and 43. These addresses are then applied to the data cache memory 13 through interfaces 45 and 47 to retrieve operands from the address locations in circuits 49 and 51. These operands are then temporarily stored in latches 53 and 55 at the beginning of the next stage of the pipelines.

This next stage is the execution stage that includes two ALUs 57 and 59. The operands read from the data cache memory 13, other data stored in the registers 39, and data provided in the instruction itself are all used by the ALUs 57 and 59 in the manner specified by the individual instructions being executed in the respective pipelines. The results of the arithmetic operations performed in the execution stage are then temporarily stored in latches 61 and 63, at the beginning of the next stage of each pipeline.

That final stage includes blocks 65 and 67 for writing back the result of the execution into either the cache memory 13 or one of the registers 39. The pipeline utilizing the block 65 writes to the cache memory 13 through its port A, and the second pipeline, through the block 67, writes to the cache memory 13 through its port B.

It will be recognized that the prior art two pipeline architecture, as illustrated in FIG. 1, includes the maximum capability in each stage that may be required to process each instruction. As a result, many instructions do not use that capability. For example, any instruction that does not need to fetch an operand from the data cache 13 will skip over the address generation and operand fetch stages of adders 35 or 37 and memory interfaces 45 or 47. Other instructions need very little arithmetic operation so that the capability of the ALUs 57 or 59 are only partially utilized to execute those types of instructions.

As part of the present invention, these characteristics of the operation of a two pipelined microprocessor have been recognized to allow the addition of a third pipeline without having to provide access to the data cache memory 13 by that third pipeline. The addition of another port to the data cache 13 requires a different memory that, when implemented, takes much more space and power than is practical. Thus, according to the present invention, a third pipeline without data memory access is utilized to process in parallel with the two main pipelines those instructions that do not need such access. And since all the instructions do not need the full power of a typical high-performance address generation stage adder or execution stage ALU, the third pipeline also implements these stages with a less complex, lower performance adder and ALU that are sufficient for a large proportion of instructions being processed. These instructions are then implemented in much less space and with the use of much less power than the full performance stages provided in the other two pipelines.

In addition, the present invention provides for switching stages between pipelines so that a given instruction has just enough resources that it needs for its processing but without the need to consume additional unnecessary resources.

Figure 2B:
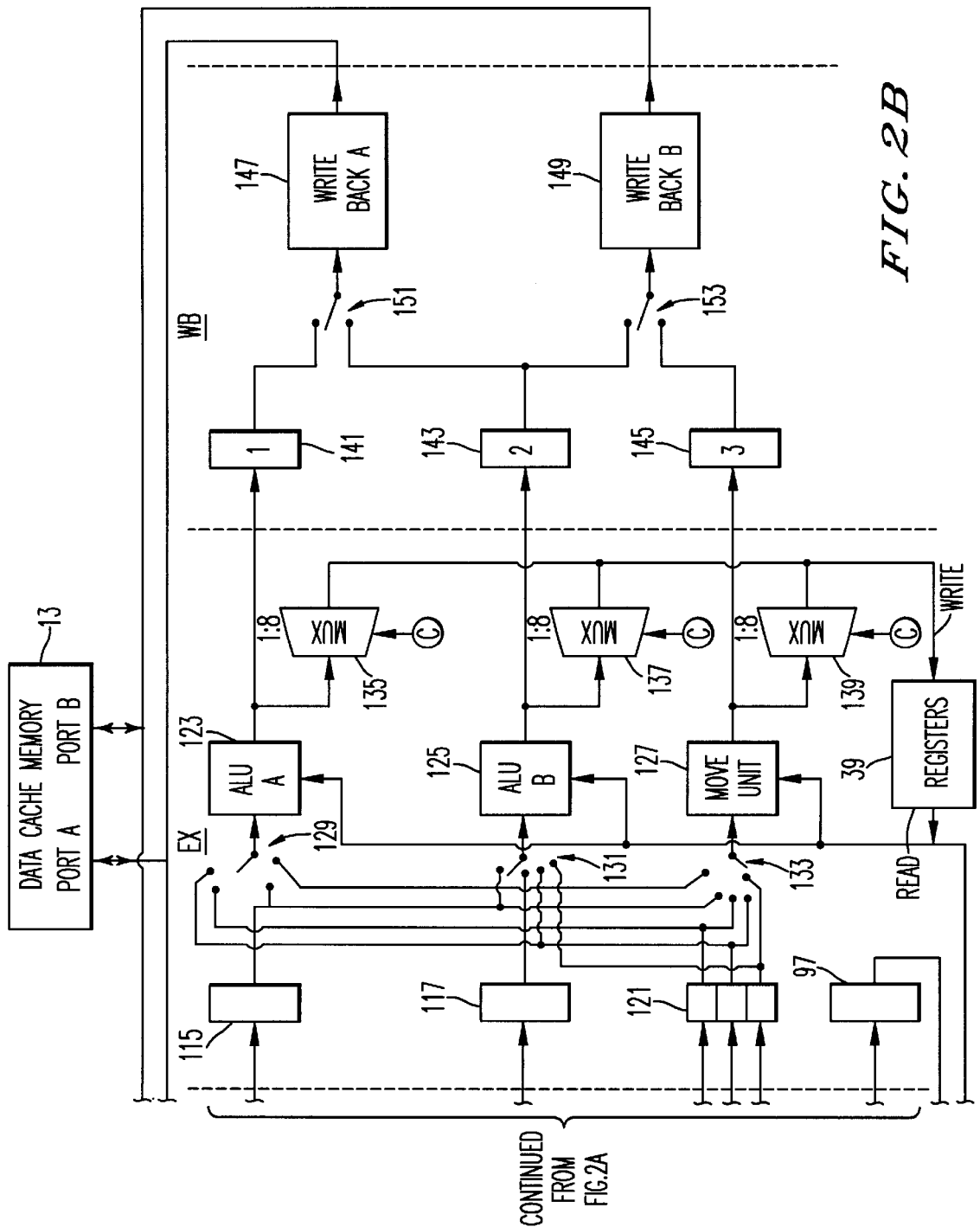
FIG. 2 illustrates, in a simplified form, a three pipeline microprocessor architecture utilizing the various aspects of the present invention.

An implementation of these various aspects of the present invention are conceptually illustrated in the three pipeline microprocessor of FIG. 2, wherein blocks performing functions substantially as in the prior art system of FIG. 1 are given the same reference numbers. A first stage of the pipelines, common to all three, is an instruction decoding (ID) stage including an instruction queue 71. In this stage, the serial stream of instructions being read out of the instruction cache 11 are separated into their individual instructions, which are usually of variable length. Processing and predicting of target addresses of branch instructions as part of the instruction fetch 17 are given in copending patent application entitled "Improved Branch Prediction Mechanism," of Sean P. Cummings et al., filed Sep. 4, 1998, which application is incorporated herein in its entirety by this reference.

A next stage, also common to each of the three pipelines, is an instruction issue (IS) stage including a circuit block 73 that receives the instructions from the queue 71 and outputs three at a time on circuits 75, 77 and 79. These instructions are individually applied to respective latches 81, 83 and 85 at the beginning of the next stage of the processing, the address generation (AG) stage. These instructions are also received by a control unit 87 that decodes them and provides control signals to other stages and blocks of the microprocessor in order to configure them appropriately to provide the proper resources and operation to process each set of instructions.

The address generation stage of each of the three pipelines includes respective adders 89, 91 and 93. The adders 89 and 91 are full performance adders that are capable of generating an address for any of the known set of instructions, while the adder 93 is made to have less capability but remaining capable of performing the adder function with some subset of the fill set of instructions that are frequently encountered. This allows the third adder 93 to be efficiently utilized with the other two. In a specific implementation, the third adder 93 is especially designed to respond to jump instructions for calculating an address to which the instruction fetch unit 17 should jump. The jump address calculated by the third adder 93, after being delayed for two operational cycles by being moved through latches 95 and 97 in sequence, is sent through circuits 99 as an address to the instruction fetch block 17.

In the implementations of the various aspects of the present invention being described with respect to the drawings, instructions are issued by the block 73 so that three successive instructions are stored in order by the latches 81, 83 and 85. The adder 89 is provided with an input switch 101 that allows it to be connected to receive an instruction from either of the registers 81 or 83. Similarly, the adder 91 has an input connected by a switch 103 to the instructions in either of the latches 83 or 85. The third, less complex, adder 93 has its input connectable through a switch 105 to the instructions in any of the three latches 81, 83 or 85. Thus, it can be seen that two of the three instructions stored in the latches 81, 83 and 85 requiring a full capability adder may be connected to the adders 89 and 91 while the remaining instruction, if it can be processed by the third adder 93, is connectable to the adder 93 from any of the latches 81. 83 or 85.

The outputs of the full adders 89 and 91 are addresses that are stored in latches 107 and 109 of the next stage, the operand fetch (OF) stage. These addresses are applied through respective interface circuits 111 and 113 to the ports A and B of the data cache memory 13. The resulting operands read from the memory 13 are stored in respective latches 115 and 117 in the next stage of each of the two primary pipelines. In the third pipeline, the outputs of the latches 81, 83 and 85 are moved through the operand fetch and into the execution stages through latches 119 and 121.

The execution units of the two primary pipelines include full capability ALUs 123 and 125. The third pipeline includes a logic unit 127 having lesser capability, in this example, being dedicated to moving data from one location to another. Each of the ALUs 123 and 125 and the move unit 127 have accompanying input switches 129, 131 and 133, respectively. Each of the switches 129, 131 and 133 of the execution stage, as well as the adder switches 101, 103 and 105 of the address generation stages, are set by signals from the control unit 87 that result from decoding the instructions being executed.

The input of the move unit 127 is connectable through its switch 133 to either of the two operands read from the memory 13 and stored in the latches 115 and 117, or to any of the three instructions being processed in parallel and stored in the latches 121. The switch 131 connects the input to the full capability ALU 125 to any one of four of those same inputs, connection to the instruction which has come through the register 81 being omitted. Similarly, the ALU 123 is connectable through its input switch 129 to four of the same five inputs, the instruction coming through the register 85 being omitted. The switches 129, 131 and 133 allow an ALU of an appropriate capability to be matched for executing an instruction that needs that capability and, with high probability, matched within an instruction that does not waste that capability.

Outputs of the ALUs 123 and 125 and the move unit 127, are connected with respective multiplexers 135, 137 and 139 for connecting their respective outputs to different selected ones of the eight registers 39. These multiplexers are set by controls (indicated by ©) from the control unit 87 consistent with the instructions that have been executed. Similarly, these two outputs of the ALUs 123 and 125, and the output of the move unit 127, are submitted to respective latches 141, 143 and 145 for potential writing back into the data cache memory 13 through a write back circuit 147 for port A of the memory and 149 for its port B. Switches 151 and 153 are operated to connect data from two of the three latches 141, 143 and 145 for writing in one cycle back into the data cache 13. It can be seen that only two of the three pipelines may access the data memory 13 at one time. But since a large proportion of instructions of a usual program do not require data memory access, this limitation does not prevent execution of three instructions at the same time in most instances.

It will be recognized that, as with all pipelines, instructions are executed in sequence as they move through the pipelines from left to right of the block diagram of FIG. 2. One set of instructions stored in the registers 81, 83 and 85 are processed by respective ones of the adders 89, 91 and 93 in one operating cycle, with the results stored in the latches 107, 109 and 95, respectively. At the same time these three instructions are moved to the latches 119, a second set of instructions is then loaded into the latches 81, 83 and 85 for processing in the AG stages during the next operating cycle at the same time that the first set of instructions is being processed as the OF stage. In a next operating cycle, the first set of instructions, and the results of partially processing them, is moved to the EX stage while a third set of instructions is loaded into the registers 81, 83 and 85. Lastly, the first set of instructions, after execution, is either written into the register 39 or moved to the output latches 141, 143 and 145 for writing back into the data memory 13 in a fourth operating cycle, during which a fourth set of instructions is loaded into the registers 81, 83 and 85 for processing in the AG stage.

Although the architecture conceptually illustrated in FIG. 2 has been described as three distinct pipelines it will be recognized that, because of the three sets of switches 101/103/105, 129/131/133 and 151/153, that a given instruction can travel through one stage in one pipeline, and through a subsequent stage in a different pipeline. This, in effect, dynamically creates, in response to the control unit 87 decoding the instructions and knowing the resources that each instruction needs, a separate pipeline for that instruction made up of one of the three possibilities for each stage that is consistent with the requirements of the instruction.

Some examples of the configuration of the various stages of FIG. 2 to process various types of instructions will now be described in general. An adder of the AG stage, and thus also the path taken in the OF stage, are selected for a given instruction independently of selecting the ALU in the EX stage. For example, if an instruction requires an arithmetic operation, one of the full capability ALUs 123 or 125 is selected for use in processing that instruction. Whether one of the full capability adders 89 or 91, and their respective access to the ports of the data cache memory 13, are required, depends on whether an operand to be used by a selected ALU is to come from the memory 13. In many cases, however, the operands used by the selected ALU will come from the instruction itself, and/or the resisters 39. In this latter case, the instruction reaches the ALU through the latches 119 and 121 without using either of the adders 89 or 91.

Another example is an instruction for a move of data, in which case the move unit 127 is selected in the EX stage, if available, thereby leaving the full capability ALUs 123 and 125 for execution of other instructions at the same time. If the instruction calls for a move to be made between two of the registers 39, then the control unit 87 causes the instruction to be sent directly to the move unit 127 through the registers 119 and 121. However, if the instruction requires that data be moved out of the data memory 13, then one of the adders 89 or 91, with its access to the memory interfaces 111 and 13, respectively, is used in order to provide that read data to the input of the move unit 127 through the switch 133. In this case, the instruction flows through one of the two major pipelines until data is read from the cache memory 13, at which time that data is then given to the move unit 127 of the third, reduced capability pipeline.

Similarly, if data is to be written into the cache memory 13 as part of a move instruction, one of the two write back units 147 and 149 is utilized. The particular configuration is set by the control unit 87 decoding the individual instructions and setting the switches appropriately. Yet another example is the processing of a jump instruction, which is processed almost entirely by the lesser capability adder 93.

It will be noted, as mentioned earlier, that the instructions are loaded into the latches 81, 83 and 85 in the order in which they are to be executed. These instructions are then individually routed through the various stages by the control unit 87 setting the various switches, as described. Alternatively, the control unit 87 could cause these instructions to be loaded into the latches 81, 83 and 85 in a different order consistent with their resource requirements, and eliminate at least the switches 101, 103 and 105, and probably simplifying others. However, this makes it very hard to keep track of the order of the instructions being executed. The architecture described with respect to FIG. 2 provides the maximum flexibility in customizing the individual pipeline resources to the requirements of the instructions.

The embodiment of a three pipeline microprocessor conceptually described in FIG. 2 is given in more detail with respect to FIGS. 3–7. An overview of that implementation is given in FIG. 3. The stages of the pipeline include initial instruction decode (ID) and instruction issue (IS) stages that are common to each of the three parallel pipelines. A set of three instructions is provided through circuits 151, 153 and 155 to an address generation (AG) stage. The AG stage also receives data read from one or more of the registers 39 if so designated by an instruction being processed. Outputs 157–164 of the AG stage are applied to the operand fetch (OF) stage which in turn provides any read operands, instructions and other data to an execution stage (EX) through circuits 167–174. The execution stage also receives data from one or more of the registers 39 if designated by an instruction being processed. The results of the processing of each set of three instructions is provided at circuits 177, 179 and 181 to the write back (WB) stages. The EX stage also has an output which is a jump instruction that is applied back to the instruction fetch block 17. The WB stages cause the results of the instruction processing to either be written back to the cache memory 13 through circuits 187 or 189, or sent as a jump instruction through circuit 185 back to the instruction fetch block 17, or some combination of these possibilities among the three instructions that have been processed. The results of the instruction processing of the EX stage could be written back to one or more of the registers 39 in the WB stage but the implementation being described writes to the registers 39 in the EX stage.

Figure 3:
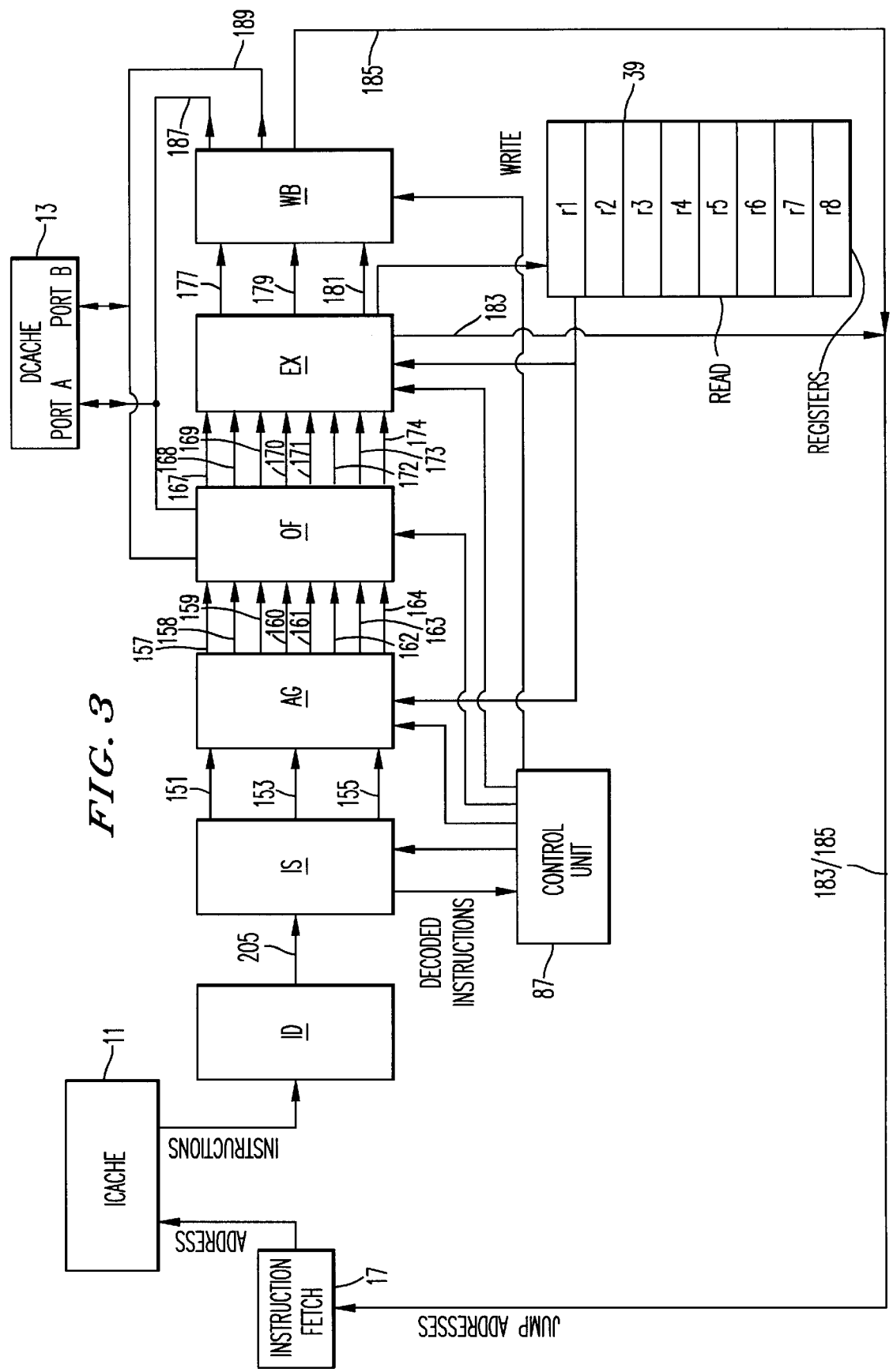
FIG. 3 illustrates the major stages of a detailed example of a three pipeline microprocessor utilizing the various aspects of the present invention.

Further details of the structure and operation of the cache memories 11 and 13 in the processor of FIG. 3 are given in copending patent applications Ser. Nos. 09/100,551 and 09/100,846, both filed Jun. 19, 1998, which applications are expressly incorporated herein in their entirety by this reference.

Figure 4:
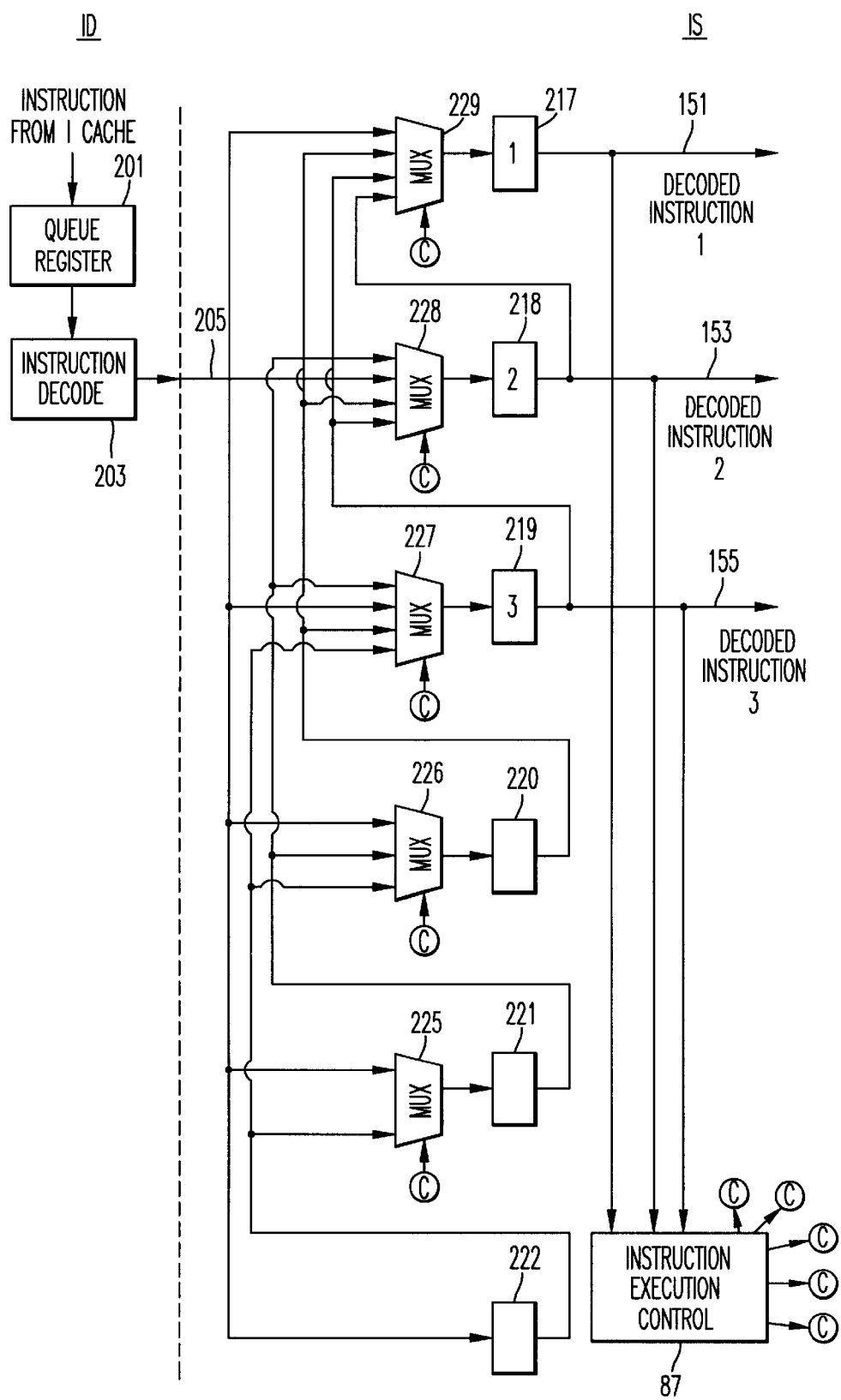
FIG. 4 is a block diagram showing additional details of the ID and IS stages of the microprocessor of FIG. 3.
Figure 5A:
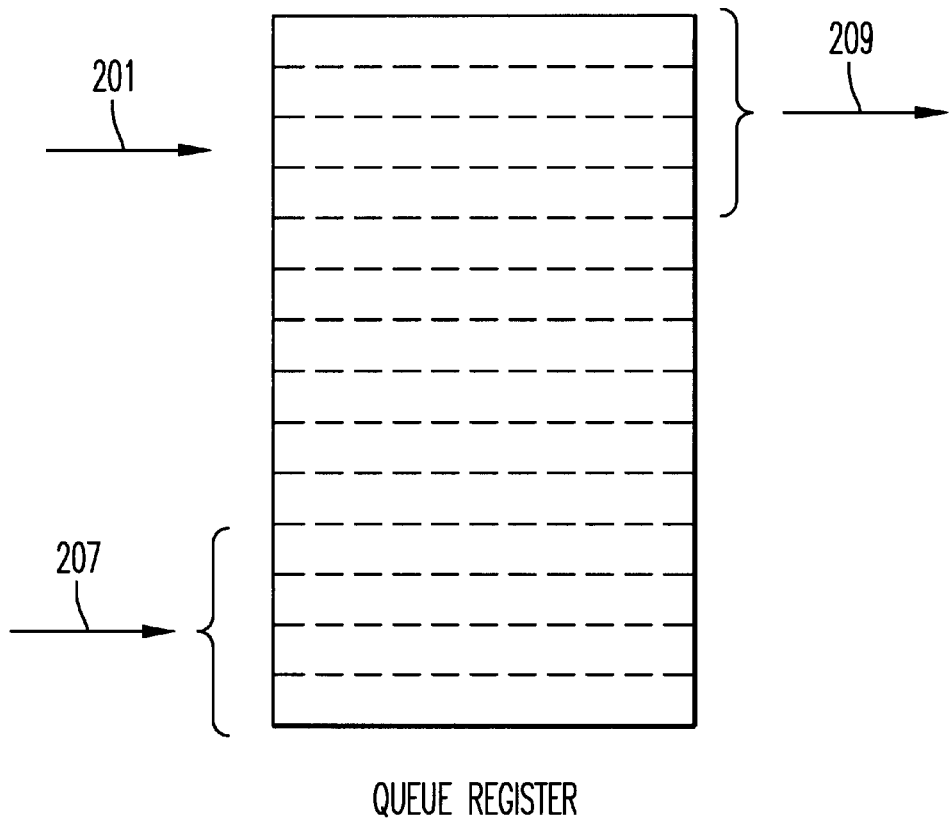
FIGS. 5A and 5B illustrate the structure of the queue register and form of data stored in it, respectively, if the ID stage shown in FIG. 4.
Figure 5B:
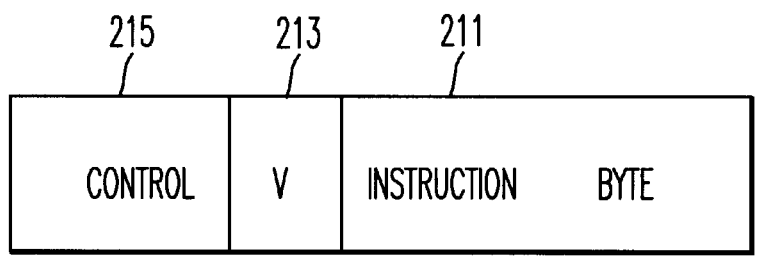

Referring to FIGS. 4, 5A and 5B, the instruction decode (ID) stage of the FIG. 3 microprocessor is given in more detail. Instructions are serially read from the instruction cache 11 and into a queue register 201. The system being described provides for the instructions having a variable number of bytes, depending primarily upon whether and individual instructions includes one or more bytes of address and/or one or more bytes of operand It is therefore necessary to separate the steady stream of bytes into individual instructions. This is accomplished by tagging the bytes within the queue register 201 and then decoding the stream of bytes by decoding circuitry 201 in order to group the bytes of each instruction together as a unit. An output 205 of the decoding circuitry 203 carries the bytes of individually identified instructions to the next pipeline stage.

FIGS. 5A and 5B illustrate how this level of decoding is accomplished. One or more bytes of instruction 207 is inputted at a time into one end of a logically defined shift register 201 from the instruction cache memory 11. The instruction bytes are read out of the shift register 201, one or more bytes 209 at a time. As instruction bytes are read out of the register 201, other bytes in it are shifted up through the register and new ones added to the bottom from the instruction cache 11. The register 201 in FIG. 5A is shown to have a width sufficient to contain a word illustrated in FIG. 5B that includes a byte 211 of instructions, a validity bit 213 and several control bits 215. The control bits 215 identify the first byte of each instruction and designate the number of bytes in the instruction. As these bytes are individual read out of the register 201, the decoder 203 identifies the beginning and ending byte of each instruction.

Various specific alternative structures of the queue register 201, and their operation, are given in copending patent application entitled "Improved Instruction Buffering Mechanism," of Kenneth K. Munson et al., filed Sep. 4, 1998, which application is incorporated herein in its entirety by this reference.

These instructions are then arranged by the instruction issue (IS) stage in their order of execution. Shown in the IS stage of FIG. 4 are six latches 217–222, each of which is capable of storing the maximum number of bytes forming any instruction that is expected to be received by the stage. The three latches 217–219 present one set of three decoded instructions at a time to respective circuits 151, 153 and 155. Rather than loading the three latches 217–219 directly from the instruction decoder 203, instructions are first loaded into the latches 220–222 and then individually moved tip into the latches 217–219 as instructions are sent from the latches 217–219 out along the remaining stages of the pipeline. This shifting of instructions upward among the latches 217–222 as instructions are moved out of the latches 217–219 is accomplished by a set of multiplexers 225–229.

Although it is a goal to send a set of three instructions each cycle from all of the latches 217–219 along the pipeline, there will be situations where one or two instructions of a set may be held and sent down the pipeline in the next cycle. Thus, for example, if only one instruction in the latch 217 is sent down the pipeline in one cycle, the instructions in each of the remaining 218–222 are moved upward as part of that same cycle in order to reside in the latches 217–221, respectively. A new set of three instructions is then readied for entry into the next stage of the pipelines. Another instruction is then loaded into the now empty latch 222 through the circuit 205. In a case where all three instructions in the latches 217–219 are sent down the pipeline in a single cycle, the instructions residing in the remaining latches 220–222 are then moved up into the respective latches 217–219 in position to be sent down the pipeline during the next cycle.

Each set of three instructions that is poised in the latches 217–219 for being sent down the pipeline are also inputted to the control unit 87. The control unit decodes the instructions in order to ascertain how many of the three instructions may be sent down the pipeline at the same time and to determine the resources that must be allocated in the subsequent stages down stream of the IS stage for processing each instruction. This is possible since there is a known set of instructions although the number of instructions is rather large. In determining the resources required to process each instruction, and thus routing them individually through the subsequent stages, the control unit also notes and takes into account whether the instruction includes any address and/or operand bytes.

Figure 6A:
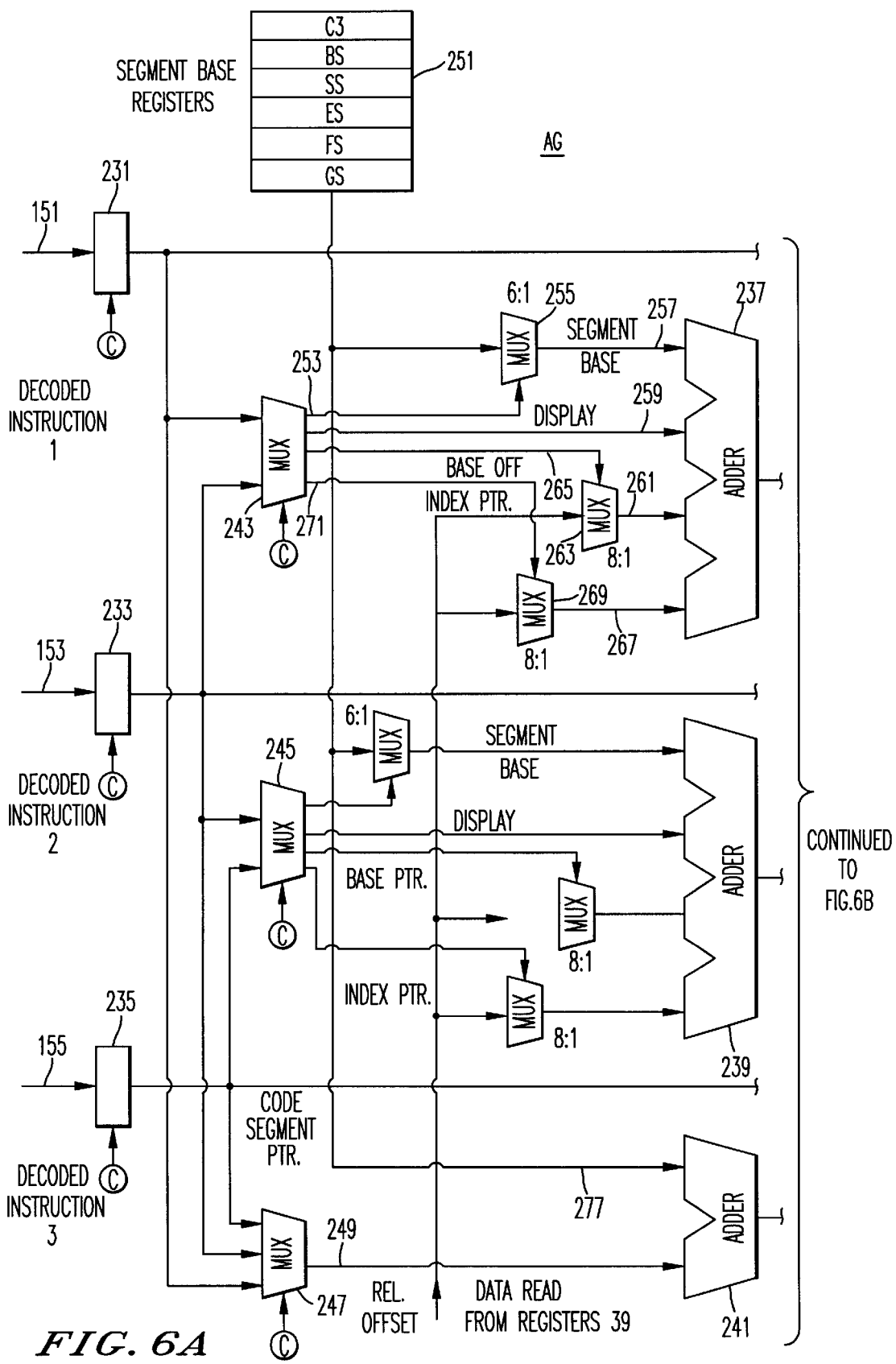
FIG. 6 is a block diagram illustrating the AG and OF stages of the microprocessor of FIG. 3.
Figure 6B:
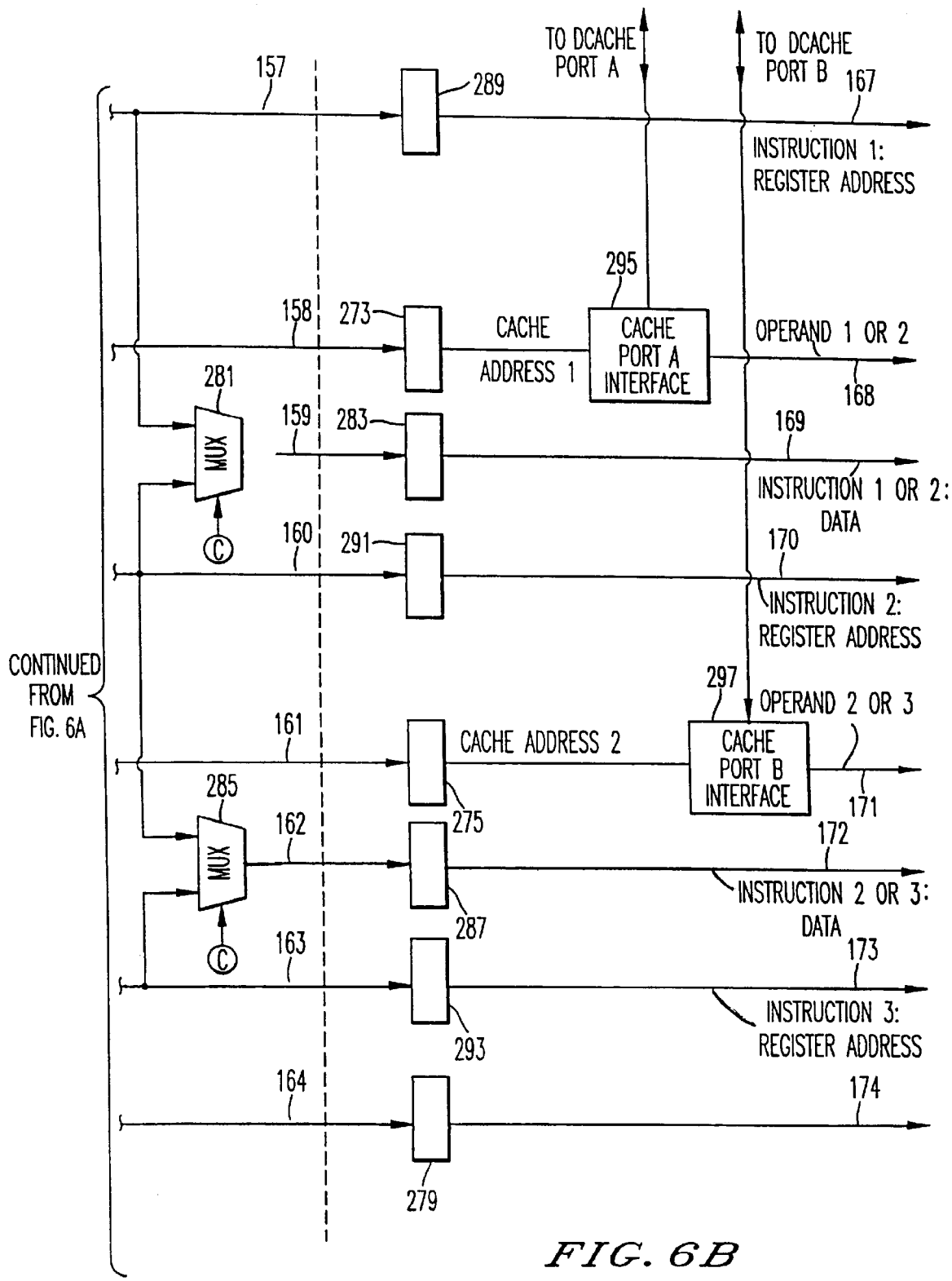
Figure 6B:
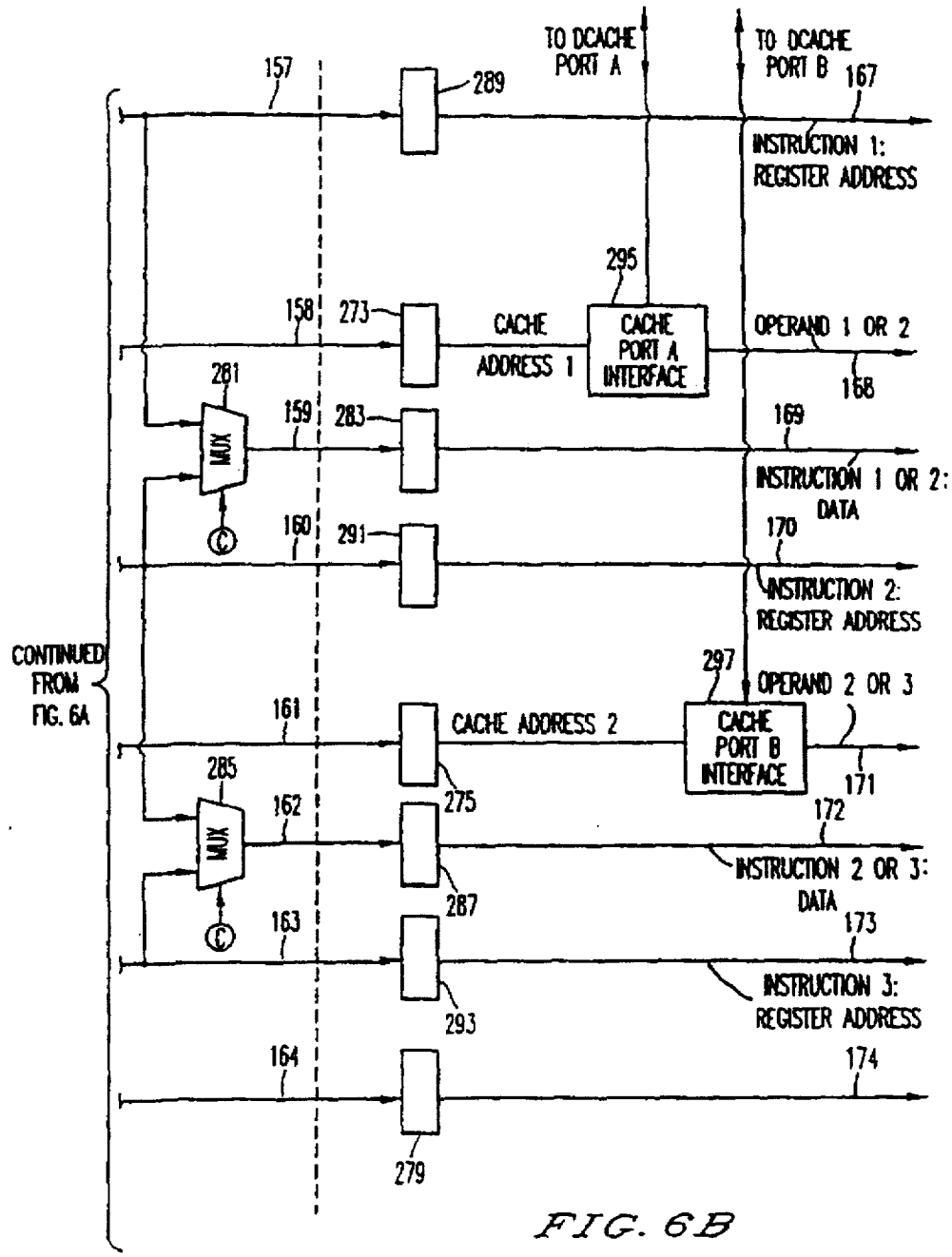

The set of three instructions in the latches 217–219 is made available to respective latches 231, 233 and 235 of the next stage, the address generation (AG) stage illustrated in FIG. 6. The control unit 87 causes those individual instructions to be latched, and thus stored, within the individual latches 231–235 that are to be sent down the pipeline together during that cycle. Any remaining instructions not latched into the latches 231, 233 and 235 are retained in the IS stage and moved up in the set of latches 217–222, as previously described.

The primary components of the AG stage are three adders, a four input port adder 237, another four input port 239 and a much simpler, two input port adder 241. The results of the address calculations of each of these adders occurs in respective outputs 158, 161 and 164. The inputs to each of these adders 237, 239 and 241 are controlled by respective multiplexers 243, 245 and 247. The multiplexer 243 selects, in response to a control signal from the control unit 87, the instruction in either of the latches 231 or 233 that designates the inputs to the adder 237. The multiplexer 245 serves a similar function with respect to the adder 239, selecting the instruction in either of the latches 233 or 235. Similarly, the multiplexer 245 selects from any three of the instructions stored in the latches 231, 233 or 235, to form one input 249 to the adder 241.

Each of the adders 237 and 239 operate similarly to those of current two pipeline microprocessors. One component 253 of a selected instructions operates a multiplexer 255 to present at one of the input ports 257 to the adder 237 the contents of one of many registers 251 that are part of a standard microprocessor. Each of these registers contains a base address for a segment of memory in which certain types of data are stored. For example, a "CS" register contains the base address for a block of memory containing code, a "DS" register designating a base address of a block of memory for data, a register "SS" containing a base address for a block of memory used for a stack, and so forth.

A second input port 259 to the adder 237 receives a displacement component of the instruction, if there is such an address component to the instruction being processed during a given cycle. A third input port 261 receives the content of one of the eight register 39 as selected by a multiplexer 263 in response to a base offset portion 265 of the instruction. Similarly, a fourth input port 267 to the adder 237 is connnectable to another one of the registers 39 through a multiplexer 269 in response to an index pointer 271 component to the instruction.

The result at the output 158 of the adder 237 is an address within the cache 13 where an operand is to be found that is required to execute the instruction. This address is stored in a latch 273 within the next stage, the operand fetch (OF) stage. The adder 239 receives the same four inputs, although for a different one of the set of three instructions that are in the AG stage at the time, and similarly calculates another address in an output 161 that is stored in a latch 275.

Another adder (not shown) can optionally be included within the AG stage as an auxiliary address generator to assist the adders 237 and 239 calculate addresses for string and jump instructions. This is described in copending patent application Ser. No. 09/088,233, filed Jun. 1, 1998, which application is expressly incorporated herein in its entirely by this reference.

The third adder 241 shown in FIG. 6 is, in this specific example, dedicated to calculating an address within the instruction cache memory 11 from a jump instruction. Thus, one of its input ports 277 receives the contents of the CS register within the group of registers 251 while a second input 249 receives a relative offset component of an address within the code segment of memory. A jump address calculated by the adder 241 appears that at its output 164 which is then stored in a latch 279 at the beginning of the next OF stage.

In addition, the AG stage selects by a multiplexer 281 the data from one of the instructions stored in the latches 231 or 233 for storage during the next operational cycle and a latch 283 at the beginning of the OF stage. Similarly, a multiplexer 285 selects data within either of the instructions stored in the latches 233 or 235 for storage during the next cycle in a latch 287. Further latches 289, 291 and 293 of the OF stage store addresses from the instructions stored respectively in latches 231, 233 and 235 of the resisters 39.

The primary operation occurring in the OF stage is to read up to two operands from the data memory 13 located at the addresses stored in the latches 273 and 275. Memory interface circuits 295 and 297 provide such access respectively to the A and B ports of the data cache 13. A result in the circuits 168 and 171 is two operands read from the data memory 13, if indeed a given set of instructions present in the OF stage calls for two such operands. There may be cases where only one operand is fetched, or more unusually, when no operand is fetched by these stages.

It will be noted that the address outputs of the principal adder 237 and 239 are connected to access only the respective ports A and B of the data cache memory 13. No multiplexing is provided to alter this connection since that element of flexibility is not required. The entire data cache memory 13 may be accessed through either of its ports A or B. The third adder 241, of course, does not form an address for the memory 13.

The next processing stage, the execution (EX) stage, has eight input latches 301–308 that store, in the next operational cycle, the contents of the circuits 167–174. This stored information is available for use by full capability ALUs 311 and 313, and by a specialized unit 315 to move data between the registers 39 and the data cache 13, or between individual ones of the registers 39. The move unit 315, in effect, is a single input port, limited capability ALU. The ALU 311 has two input ports 317 and 319 that receive signals selected by respective multiplexers 321 and 323. Similarly, the ALU 313 has corresponding two input ports 325 and 327 that receive inputs selected by respective multiplexers 329 and 331. In addition, the ALU 313 is provided, in this particular sample, with a third input port 333 that is also connected to the output of the multiplexer 323, for reasons described below. The data move unit 315 has a single input port 335 from an output of the multiplexer 337.

The inputs to each of the multiplexers 321 and 323 for the ALU 311 are the same. Multiplexers 339 and 341 select the contents of one of the registers 39 as one of the respective inputs to each of the multiplexers 321 and 323, in response to a register address from one of two instructions as selected by a multiplexer 343. The remaining four inputs to each of the multiplexers 321 and 323 are the contents of the latches 302, 303, 305 and 306.

Each of the multiplexers 329 and 331 supplying two of the input ports of the ALU 313 are similarly connected in order to provide that ALU with a similar range of potential inputs. Multiplexers 345 and 347 provide one of the respective inputs to each of the multiplexers 329 and 331, which is one of the registers 39 that is selected by one of the instructions within the latches 304 and 307, as selected by a multiplexer 349. The remaining four inputs of each of the multiplexers 329 and 331 are connected with the contents of the latches 302, 303, 305 and 306, respectively.

The multiplexer 337, which selects an input 335 to the move unit 315, similarly has an input connected to a multiplexer 351 that selects data from one of the registers 39 as one of its inputs, in response to the contents of any one of the three instructions stored in the latches 301, 304 or 307, as selected by a multiplexer 353. The remaining four inputs to the multiplexer 337 are the same as the other multiplexers described above, namely, the contents of the latches 302, 303, 305 and 306.

The data outputs of each of the ALUs 311 and 313, and the move unit 315, are stored in a next cycle in individual ones of latches 361, 363 and 365 at the input to the next processing stage, a write back (WB) stage. The data outputs of units 311, 313 and 315 are directed to the latches 361, 363 and 365 by respective multiplexers 367, 369 and 371. The latch 361 may receive the data output of either the ALU 31 or the move unit 315. The latch 363 may receive the output from any three of the units 311, 313 or 315, depending upon the control signal to the multiplexer 363. The latch 365 receives the data output of either of the ALU 313 or the move unit 315.

Since the outputs of the ALUs and move unit can be directed to any of the latches 361, 363 or 365, an order of the set of instructions being executed is reestablished to be the same as originally presented in latches 217–219 of the IS stage. For example, if the instruction of one set stored in the latch 217 (FIG. 4) can be executed with the move unit 315, it can be routed to the move unit 315 without tying up a more complex ALU 311 or 313. Once that instructions is executed by the EX stage of FIG. 7, the result is then stored in the latch 361 to take its place in the same order as when launched by the IS stage.

In the last WB state of the pipeline, one of the two executed results stored in the latches 361 or 363 is selected by a multiplexer 373 for writing back into data cache memory 13 through its port A. Similarly, a multiplexer 375 can connect either of the executed results within either of the registers 363 or 365 to the cache memory 313 port B. Of course, the executed data results are sent to the memory 13 only when the are to be stored in it.

If any of the data results are to be stored in the registers 39, this occurs within the EX stage. The resultant data selected by each of the multiplexers 367, 369 and 371 are respectively connectable to any one of the eight registers 39 through respective multiplexers 377, 379 and 381. Indeed, execution of an instruction that does not require writing a result back to the memory may be completed, and others then advanced along the pipeline behind it, without having allocate a processing cycle for the WB stage. This is further described in copending patent application Ser. No. 09/116, 023, filed Jul. 15, 1998, which application is expressly incorporated herein in its entirety by this reference.

As previously noted, the ALU 313 is unusual in that it has a third input port 333 rather than the more conventional two input port ALU 311. This added input port allows successive instructions to be processed together in parallel through two different pipelines when the second instruction requires data for its execution that is the result of executing the first instruction.

For example, consider a first instruction that calls for adding the value of a number in register r1 to the value of a number at a given location in the data memory 13 and then write the result back into the register r1, and a second instruction that requires reading that new result from the register r1 and then subtracting it from the value stored in register r4. Since the second instruction is dependent upon the first, the second instruction is typically held at the beginning of the pipeline for one operational cycle while the first instruction is processed. Enough time must elapse to allow the first instruction to write the new value in the register r1 before the second instruction causes it to be read.

However, by providing the third port 333 to the ALU 313 and by allowing it to be connected to a data source through the multiplexer 323 that is different than its other two input ports 325 and 327, both of these dependent instructions can be executed at the same time. Rather than the first instruction writing its resulting data back into the register r1, both instructions are executed together through two of the pipelines by inputting to the ALU 313 the two operands that are specified by to used by the first instruction. That is, rather than the ALU receiving an input that is the result of execution of the first instruction, it receives in two inputs the operands which were used to generate that result. In the example given above, two of the inputs of the ALU 313 are given the original data in r1 plus that in memory which are called for by the first instruction, plus the data in the register r4. Both instructions are then executed at the same time by the ALU 313. This technique of using a three input port ALU provides these advantages with a microprocessor having only two pipelines as well as in the improved three pipeline architecture being described. This feature is described in more detail in copending patent application Ser. No. 09/128, 164, filed Aug. 3, 1998, which application is expressly incorporated herein in its entirety by this reference.

As can be seen from the foregoing description of a multi-pipeline microprocessor architecture, there is an extreme amount of flexibility available to the control unit 87 for routing instructions in order to maximize the throughput of the microprocessor. With reference to the flow chart of FIG. 8, a preferred operation of the microprocessor embodiment of FIGS. 3–7 is given. In a first step 401, the latches 217–219 of the IS stage (FIG. 4) are loaded with a set of three instructions that are candidates for being executed in parallel through three different pipelines of the microprocessor. The control unit 87 examines each of the three instructions, in a step 403, to determine whether any of the three instructions depend upon the results of any of the other three instructions in a manner that would prevent all three instructions from being executed in parallel. This is commonly done now with two pipeline microprocessors, so the same techniques are extended to examining three instructions at one time instead of just two. If there is any such dependency, the control unit 87 flags any such dependent instruction so that it will not be loaded into the respective one of latches 231, 233 or 235 at the input to the AG stage (FIG. 6). This is indicated in a step 405 of FIG. 8. Of course, there will be fewer dependencies that can hold back parallel execution of instructions with the use of the three input port ALU 313 (FIG. 7) of one aspect of the present invention. If there are no unresolvable dependencies among the three instructions loaded in the latches 217–219, the step 405 is omitted.

Regardless of resolution of dependencies, there will at least be an instruction in the latch 217 that can be executed. A next step 407 designates that first instruction for examination, and a step 409 causes the control unit 87 to decode the instruction so that it may be determined what pipeline resources are necessary to execute it.

A step 411 determines whether the instruction requires access to read an operand from the cache memory 13 and, if so, directs it to a full adder. If not, the reduced capability adder 241 may be used with the instruction. Details of this are shown in the flow diagram of FIG. 9, as described below.

Another step 413 looks at the type of ALU that is required to execute the first instruction of the set that is stored in the latch 217, and assigns to it either a full capability ALU, the move unit 315 or nothing if an ALU is not required to execute the instruction. Details of the step 413 are provided in the flow diagram of FIG. 10, as described below. The steps 411 and 413 may be processed in parallel, since they are independent of one another, or, for convenience, may be performed in sequence.

A next step 415 asks whether all three instructions of the set stored in latches 217–219 (FIG. 4) have been assigned resources or held by the control unit 87. If not, a step 417 causes the steps 409, 411 and 413 to be performed on the next in order of the set of three instructions. In out example, we have only examined the first instruction in the latch 217, so the steps 409, 411 and 413 are then repeated for the second instruction stored in the latch 218. Once each of the three instructions of the set have been assigned resources, or designated to be held for a cycle, a final step 419 indicates that the switching instructions to the various multiplexers in the several pipeline stages will be issued at the appropriate times for processing each of these three instructions as they work there way through the stages of the pipelines. After that is completed, the control unit 87 returns to the step 401 by causing the next three instructions to be loaded into the latches 217–219 in the manner previously described with respect to FIG. 4.

It will be noted that at the time the control unit 87 is examining and assigning resources to the set of three instructions, other instructions earlier examined are being processed by other pipeline stages. Therefore, the resources that are allocated for a particular instruction are stored by the execution unit 87 until that instruction has worked its way down to the stage where the resource must be provided. For example, an adder of the AG stage must be provided one cycle time after the assignment is made, so the multiplexers of the AG stage are appropriately switched at that next operational cycle. Similarly, the ALU/move unit that is assigned to a particular instruction is actually not connected to receive the instruction for at least three cycle times since the EX unit is three stages downstream from the IS stage.

It will be noted from FIGS. 4–7 that the control circuit 87 provides control signals to the various multiplexers, latches and other components as the result of decoding the instructions being executed. One aspect of the control unit 87 is described in copending patent application Ser. No. 09/088,226, filed Jun. 1, 1998, which application is expressly incorporated herein in its entirety by this reference.

Figure 8:
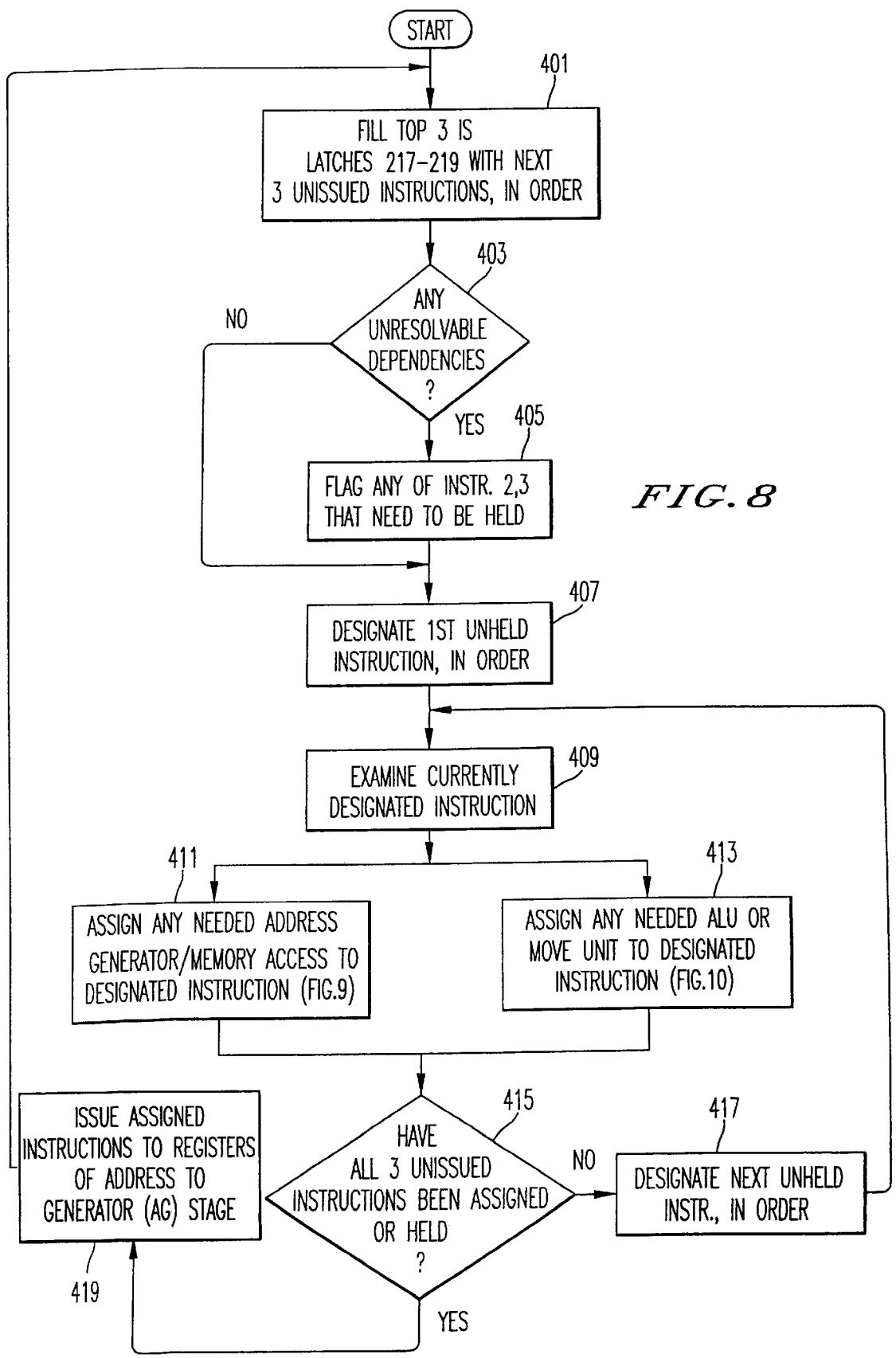
FIG. 8 is a flowchart illustrating a preferred operation of the multiple pipeline microprocessor shown in FIGS. 3–7.
Figure 9:
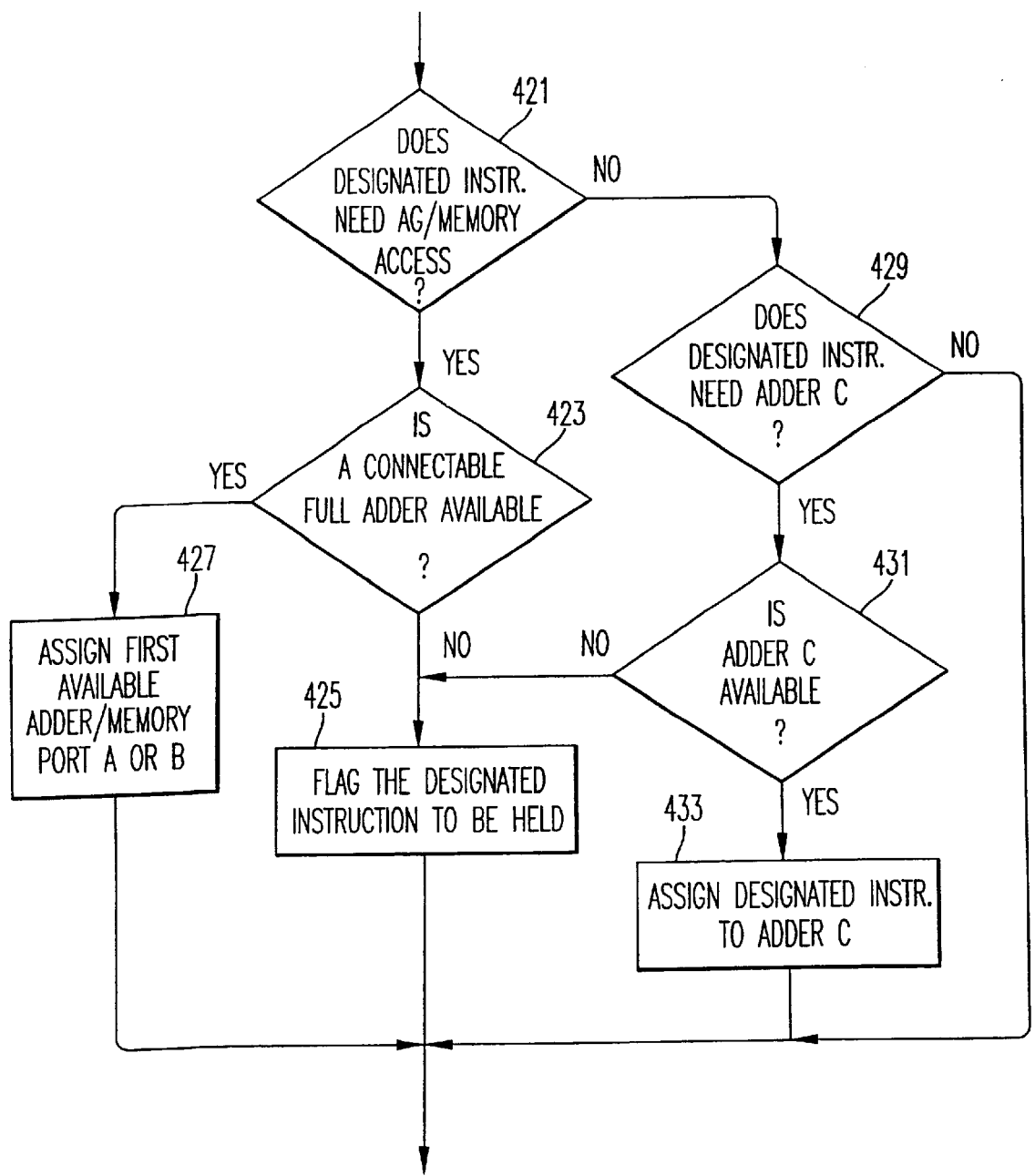
FIG. 9 is a flowchart showing the operation of the block 411 of the flowchart of FIG. 8.

Referring to FIG. 9, the algorithm for executing the step 411 of FIG. 8 is shown in more detail. A step 421 first determines whether the instruction being examined requires memory access, and thus one of the full capability adders 237 or 239. If so, a next step 423 determines whether a full capability adder is available. If this is the first or second of the set of three instructions to be examined, then a full capability adder will be available but if it is the third instruction, it needs to be determined whether both full capability adders 237 and 239 have already been designated for use by the prior two instructions of the set. If both of those adders are in use, a next step 425 shows that the instruction is flagged to be held for one operational cycle, in a manner described previously. If one of the full capability adders 237 or 239 is available, however, a next step 427 assigns the first available one to receive the instruction being examined.

Returning to the initial step 421 of FIG. 9, if the instruction is such that it does not need a full capability adder, a next step 429 determines whether the instruction needs the reduced capability adder 241. If so, it is then asked whether the adder 241 is available, in a step 431. If not, the processing proceeds to the step 425 to hold that instruction for the next cycle. If the adder 241 is available, however, a next step 433 assigns it to the instruction being examined. Returning to the step 429, if the instruction does not need the adder C, then the processing of the step 411 of FIG. 8 is completed.

Figure 10:
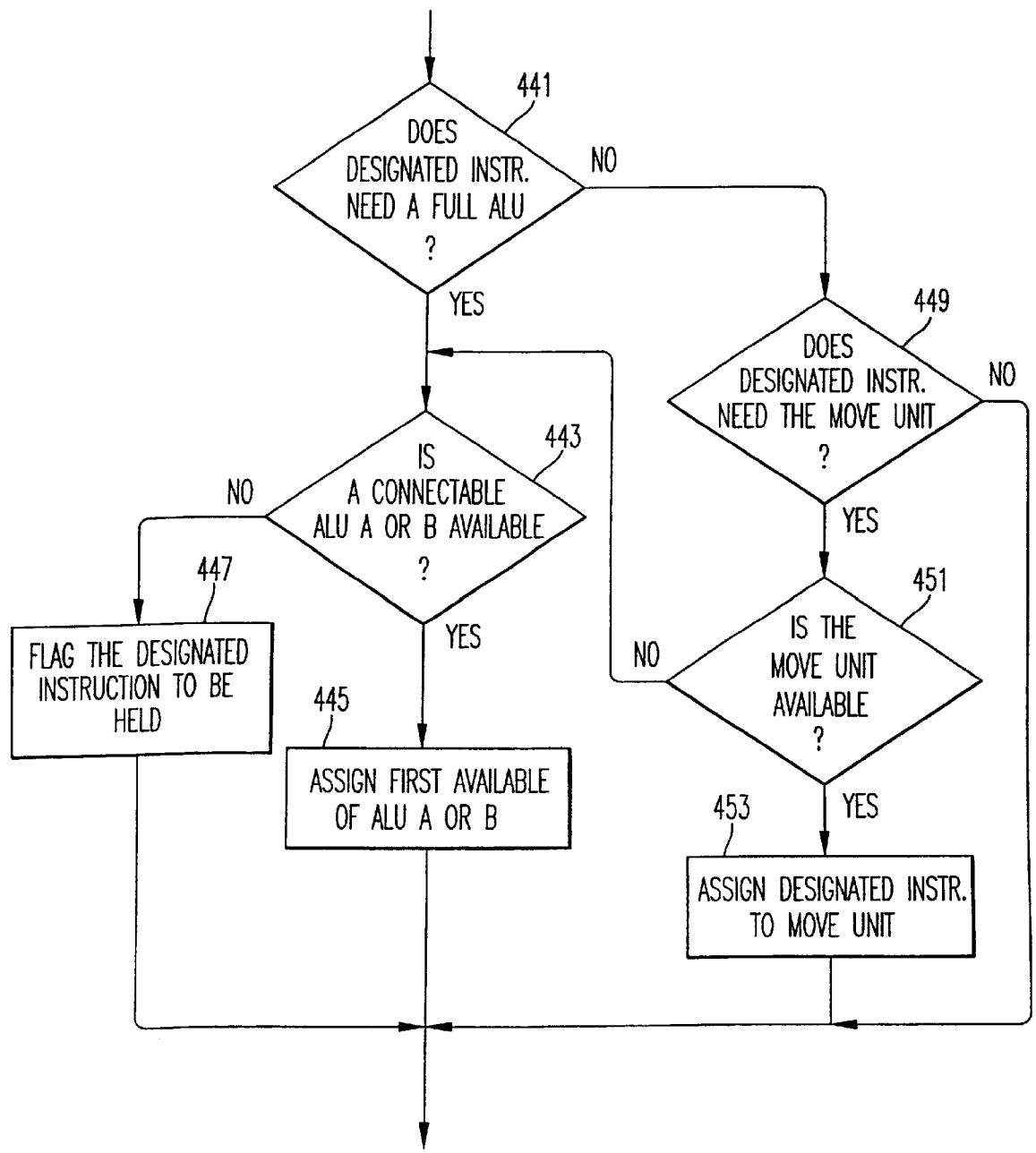
FIG. 10 is a flowchart showing the operation of the block 413 of the flowchart of FIG. 8.

Referring to FIG. 10, a similar flow chart is provided for the step 413 of FIG. 8. A first step 441 of FIG. 10 asks whether the instruction being analyzed needs one of the full ALU's 311 or 313 to be executed. If so, a next step 443 asks whether one of them is available and, if so, one is assigned to this instruction by a step 445. If neither of the ALU 311 and 313 are available, however, because they have previously been assigned to other instructions of the set, then a flag is raised in a step 447 and that instruction is held within the IS stage to be sent down the pipeline in the next execution cycle.

Returning to the step 441, if the instruction does not need one of the full capability ALUs 311 or 313, a next step 449 determines whether the instruction requires the move unit 315 for execution. If not, the processing of the step 413 of FIG. 8 is completed. But if the instruction does need the move unit 315, a next step 451 asks whether it is available and, if so, assigns it to receive that instruction at the later time, in a step 453. However, if the move unit is determined in step 451 not to be available, because it has been assigned to a previous instruction of the set, processing returns to the step 443 to ascertain whether one of the full capability ALU's 311 or 313 is available to execute the instruction. If so, one of them is assigned to it even though the instruction does not need that much capability, in order to increase the number of instructions that are being processed in parallel at all times.

As one implemention detail of the microprocessor of FIGS. 3–7, techniques for distributing clock signals to various circuit portions are given in copending patent application entitled "Improved Clock Distribution System," of Sathyanandan Rajivan, filed Sep. 11, 1998, which application is incorporated herein in its entirety by this reference.

Although the various aspects of the present invention have been described with respect to its preferred embodiments, it will be understood that the invention is entitled to protection within the full scope of the appended claims.

What is claimed:

1. A microprocessor, comprising:
   an instruction decoding stage configured to provide N sequences of decoded instructions as a plurality of N-instruction sets, each instruction of each N-instruction set corresponding to a respective one of the N sequences of decoded instructions;
   a data memory having M ports, M being less than N;
   N multi-staged pipelines, each configured to receive from the instruction decoding stage and process in parallel a corresponding instruction of each N-instruction set; and
   a control circuit, configured to dynamically connect the M ports to M pipelines for each N-instruction set, such that each pipeline receiving an instruction requiring access to the data memory is connected to a port, and each pipeline receiving an instruction not requiring access to the data memory is not connected to a port.

2. The microprocessor of claim 1, wherein at least one of the pipelines is configured to have no access to the data memory.

3. The microprocessor of claim 1, wherein:
   N is equal to three, and
   M is equal to two.

4. The microprocessor of claim 1, wherein an instruction not requiring access to the data memory comprises a jump instruction.

5. The microprocessor of claim 1, wherein an instruction not requiring access to the data memory comprises an instruction to move data between two of a plurality of registers.

6. The microprocessor of claim 1, wherein an instruction not requiring access to the data memory comprises an instruction to perform at least one of an arithmetic operation and a logic operations on data in two of a plurality of registers.

7. The microprocessor of claim 1, wherein:
   M of the N multi-staged pipelines comprise a first address generation stage and a first instruction execution stage; and
   N-M of the N multi-stage pipelines comprise a second address generation stage and a second instruction execution stage, the second address generation stage and the second instruction execution stage being less capable, smaller, and consuming less power than the first address generation stage and the first instruction execution stage.

8. The microprocessor of claim 1, further comprising:
   a set of registers, wherein
   each of the N multi-stage pipelines being configured to read from and write to the set of registers.

9. A microprocessor, comprising:
   N multi-staged pipelines configured to operate in parallel, each having a series of stages such that instructions are executed in steps, each step corresponding to a stage, N being at least 2;
   M data memory access ports, M being at least one less than N;

a switching circuit configured to individually connect and disconnect the M data memory access ports and a selected stage of a corresponding one of the multi-staged pipelines based on a need for data memory access by an instruction being executed by the corresponding one of the multi-staged pipelines; wherein at least one of the multi-staged pipelines not connected to a data memory access port is configured to execute instructions that do not require data memory access in parallel with instructions being executed by other multi-staged pipelines that are connected to data memory access ports.

10. The microprocessor of claim 9, further comprising:

P arithmetic logic units, P being at least one less than N, wherein;

the switching circuit is further configured to individually connect and disconnect the P arithmetic logic units and a selected stage of a corresponding one of the multi-staged pipelines based on a need for an arithmetic logic unit by an instruction being executed by the corresponding one of the multi-staged pipelines; wherein at least one of the multi-staged pipelines not connected to an arithmetic logic unit is configured to execute instructions that do not require an arithmetic logic unit in parallel with instructions being executed by other multi-staged pipelines that are connected to arithmetic logic units.

11. The microprocessor of claim 10, further comprising:

a move unit, wherein, the switching circuit is further configured to connect the move unit to one of the at least one of the multi-staged pipelines not connected to an arithmetic logic unit based on a need to execute an instruction that moves data between a register and one of another register and a memory.

12. A method of processing N parallel sequences of computer instructions through N pipelines having M data memory access ports, M being at least one less than N, comprising:

categorizing each instruction of an N-instruction set of instructions, as a first instruction that requires access to a memory through a data memory access port or a second instruction that does not require access to a memory through a data memory access port;

identifying at least one pipeline for each N-instruction set of instructions for executing instructions categorized as second instructions by the categorizing step;

coupling the M data memory access ports to all pipelines not identified by the identifying step;

calculating a memory address for each instruction categorized as a first instruction by the categorizing step;

reading data from the memory address calculated in the calculating step for each instruction categorized as a first instruction by the categorizing step;

executing each first instruction with the data read by the reading step in a pipeline provided with access to a data memory access point in the coupling step; and executing each second instruction in the at least one pipeline identified by the identifying step.

13. The method of claim 12, further comprising:

reserving at least one of the pipelines for executing instructions categorized as second instructions in the categorizing step.

14. The method of claim 12, wherein the executing each first instruction step and the executing each second instruction step are performed concurrently.

15. The method of claim 12, wherein the executing each second instruction step comprises executing each second instruction concurrently with the calculating step to calculate an address of another instruction.

16. The method of claim 12, wherein N is equal to 3 and M is equal to 2.

17. The method of claim 12, wherein at least one second instruction is a jump instruction that when executed calculates an address that is used to designate another N-instruction set of instructions for subsequent processing.

18. The method of claim 12, wherein at least one second instruction is one of an arithmetic operation and a logic operation that when executed operates on data in two registers.

* * * * *

UNITED STATES PATENT AND TRADEMARK OFFICE
CERTIFICATE OF CORRECTION

Figure 7A:
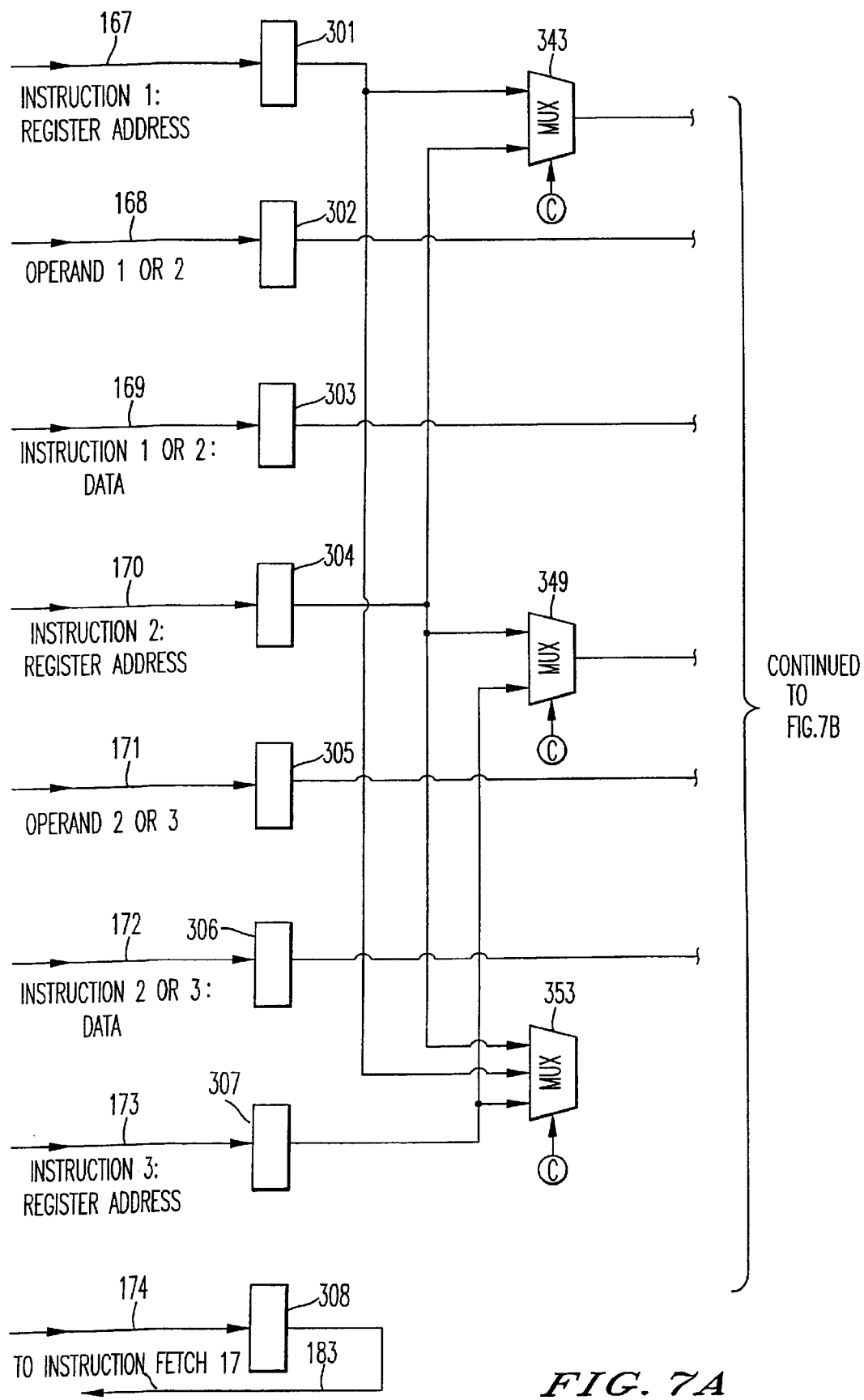
FIG. 7 is a block diagram of the EX and WB stages of the pipeline of FIG. 3.
Figure 7B:
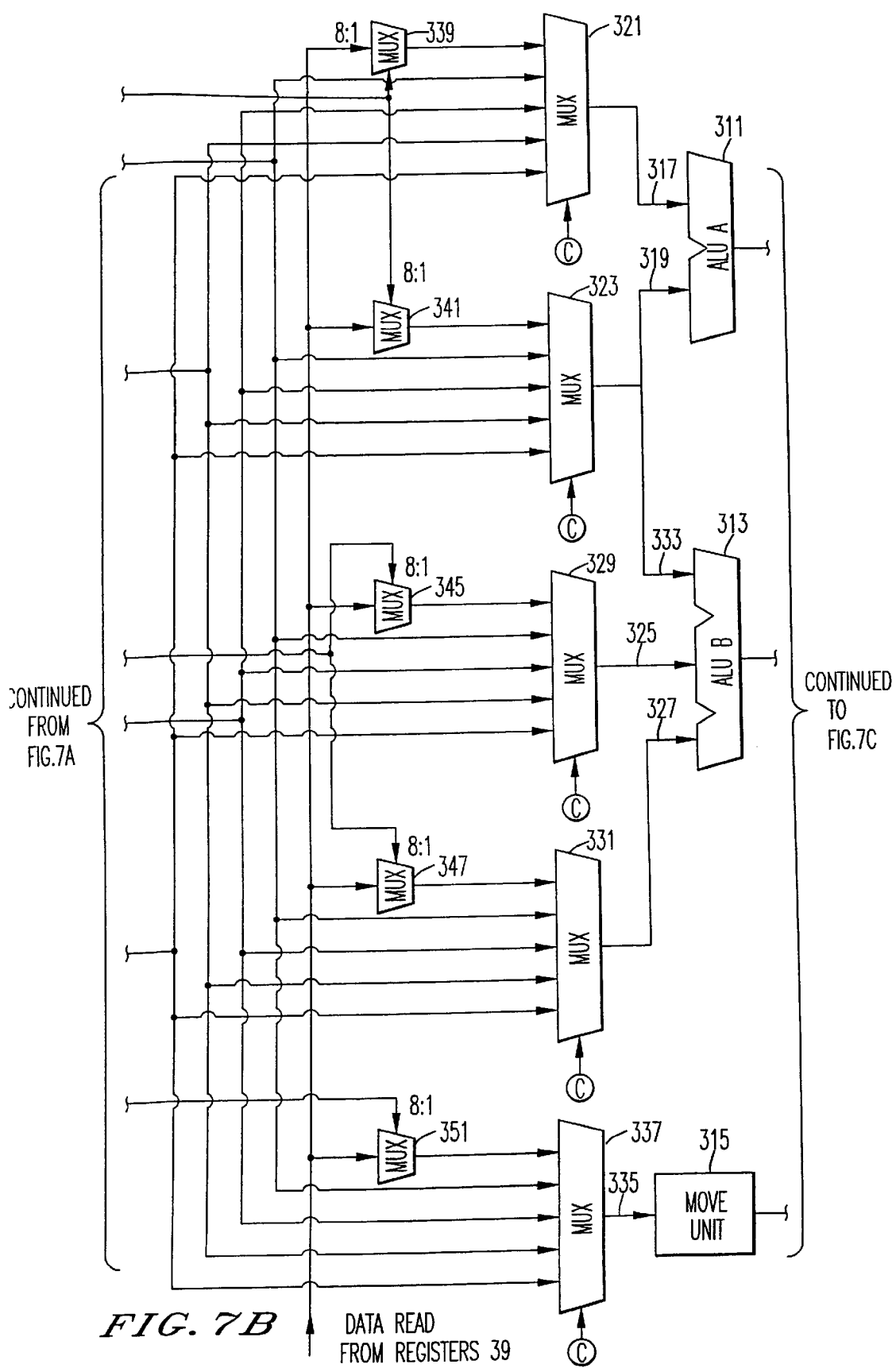
Figure 7C:
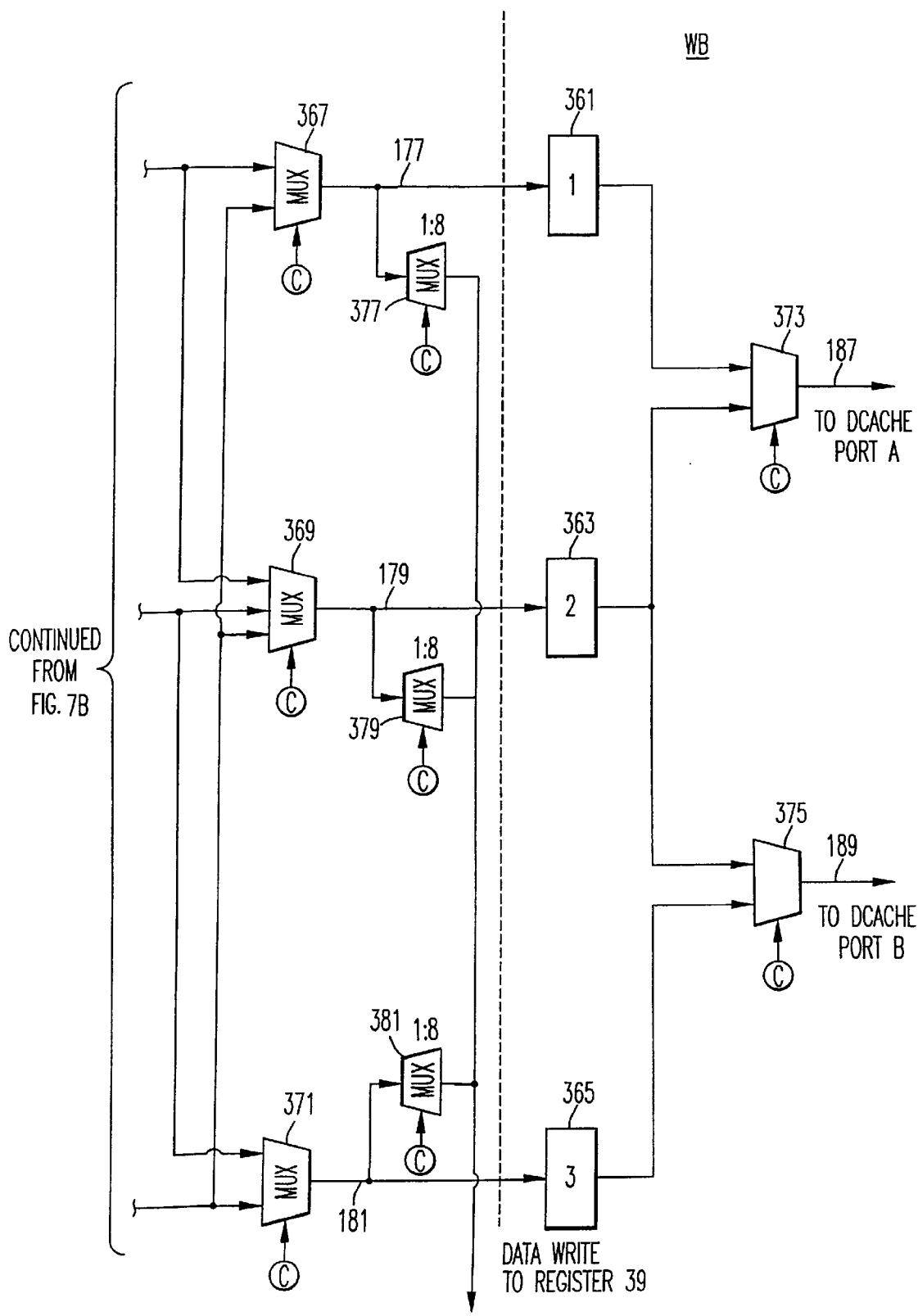

PATENT NO. : 6,304,954 B1
DATED : October 16, 2001
INVENTOR(S) : Kenneth K. Munson It is certified that error appears in the above-identified patent and that said Letters Patent is hereby corrected as shown below:

Column 3,
Line 34, please change "FIG. 6 is a block diagram" to -- FIGS. 6A and 6B are block diagrams --,
Line 36, please change "FIG. 7 is a block diagram" to -- FIGS. 7A, 7B, and 7C are block diagrams --,
Line 39, please change "FIGS. 3-7" to -- FIGS. 3-5, 6A, 6B, 7A, 7B, and 7C --.

Column 6,
Line 7, please change "fill" to -- full --.

Column 7,
Line 67, please change "resisters" to -- registers --.

Column 8,
Line 43, please change "FIGS. 3-7" to -- FIGS. 3-5, 6A, 6B, 7A, 7B, and 7C --.

Column 9,
Line 56, please change "tip" to -- up --.

Column 10,
Line 29, please change "FIG. 6" to -- FIGS. 6A and 6B --.

Column 11,
Line 20, please change "entirely" to -- entirety --,
Line 22, please change "FIG. 6" to -- FIGS. 6A and 6B --,
Line 41, please change "resisters" to -- registers --.

Column 12,
Line 43, please change "31" to -- 311 --.

Column 13,
Line 61, please change "FIGS. 3-7" to -- FIGS. 3-5, 6A, 6B, 7A, 7B, and 7C --.

Column 14,
Line 9, please change "FIG. 6" to -- FIGS. 6A and 6B --,
Line 12, please change "FIG. 7" to -- FIGS. 7A, 7B, and 7C --,
Line 40, please change "out" to -- our --.

UNITED STATES PATENT AND TRADEMARK OFFICE
CERTIFICATE OF CORRECTION

PATENT NO. : 6,304,954 B1
DATED : October 16, 2001
INVENTOR(S) : Kenneth K. Munson It is certified that error appears in the above-identified patent and that said Letters Patent is hereby corrected as shown below:

Drawings,
FIG. 6B, please replace FIG. 6B with the following substitute FIG. 6B showing arrow 159 extending from mux 281 to latch 283.

Signed and Sealed this

Thirtieth Day of April, 2002

Attest:

JAMES E. ROGAN
Director of the United States Patent and Trademark Office

Attesting Officer